United States Patent
Wong

(10) Patent No.: US 10,477,288 B2
(45) Date of Patent: Nov. 12, 2019

(54) DATA CENTER INTERCONNECT AS A SWITCH

(71) Applicant: David I-Keong Wong, Fremont, CA (US)

(72) Inventor: David I-Keong Wong, Fremont, CA (US)

(73) Assignee: David I-Keong Wong, Fremont, CA (US)

( * ) Notice: Subject to any disclaimer, the term of this patent is extended or adjusted under 35 U.S.C. 154(b) by 0 days.

(21) Appl. No.: 15/888,516

(22) Filed: Feb. 5, 2018

(65) Prior Publication Data

US 2019/0246187 A1 Aug. 8, 2019

(51) Int. Cl.
*H04Q 11/00* (2006.01)
*H04B 10/25* (2013.01)
*H04B 10/40* (2013.01)
*H04B 10/50* (2013.01)
*H04B 10/60* (2013.01)

(52) U.S. Cl.
CPC ......... *H04Q 11/0005* (2013.01); *H04B 10/25* (2013.01); *H04B 10/40* (2013.01); *H04Q 11/0003* (2013.01); *H04Q 11/0062* (2013.01); *H04B 10/50* (2013.01); *H04B 10/60* (2013.01); *H04Q 2011/006* (2013.01); *H04Q 2011/0098* (2013.01)

(58) Field of Classification Search
None
See application file for complete search history.

(56) References Cited

U.S. PATENT DOCUMENTS

| | | | |
|---|---|---|---|
| 2014/0098823 A1* | 4/2014 | Kapadia | H04L 49/10 370/412 |
| 2015/0186318 A1 | 7/2015 | Kim et al. | |
| 2016/0277320 A1 | 9/2016 | Judge et al. | |
| 2017/0063631 A1* | 3/2017 | Curtis | H04L 41/12 |
| 2017/0214579 A1 | 7/2017 | Chen et al. | |
| 2017/0310594 A1* | 10/2017 | Kotha | H04L 45/741 |
| 2019/0109783 A1* | 4/2019 | Kommula | H04L 45/26 |

OTHER PUBLICATIONS

Ferreira et al., "Facebook: Fabric Aggregator, Modular Design to Address our Traffic Demands," OpenCompute Project, 34 pages, (2018). [Retrieved from the Internet Feb. 13, 2019: <URL: https://www.opencompute.org/wiki/Networking/SpecsAndDesigns#Facebook_Fabric_Aggregator_-_based_on_Wedge_100S>].

* cited by examiner

*Primary Examiner* — Darren E Wolf
(74) *Attorney, Agent, or Firm* — Alston & Bird LLP

(57) ABSTRACT

An interconnect module ("ICAS module") includes n optical data ports each comprising n optical interfaces, and an interconnecting network implementing a full mesh topology for interconnecting the optical interfaces of each port each to a respective one of the optical interfaces of each of the other ports. In one embodiment, each optical interface exchanges data signals over a communication medium with optical transceiver. The interconnecting module may implement the full mesh topology using optical fibers. The interconnecting module may be used to replace fabric switches as well as a building block for a spine switch.

22 Claims, 19 Drawing Sheets

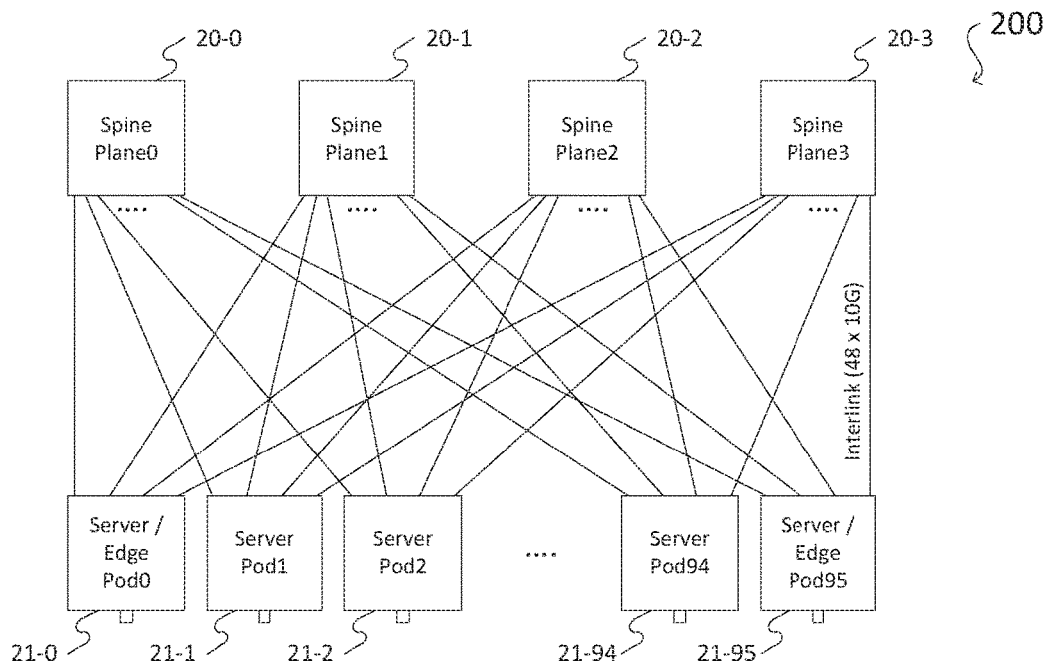
Figure 2a    Typical Data Center
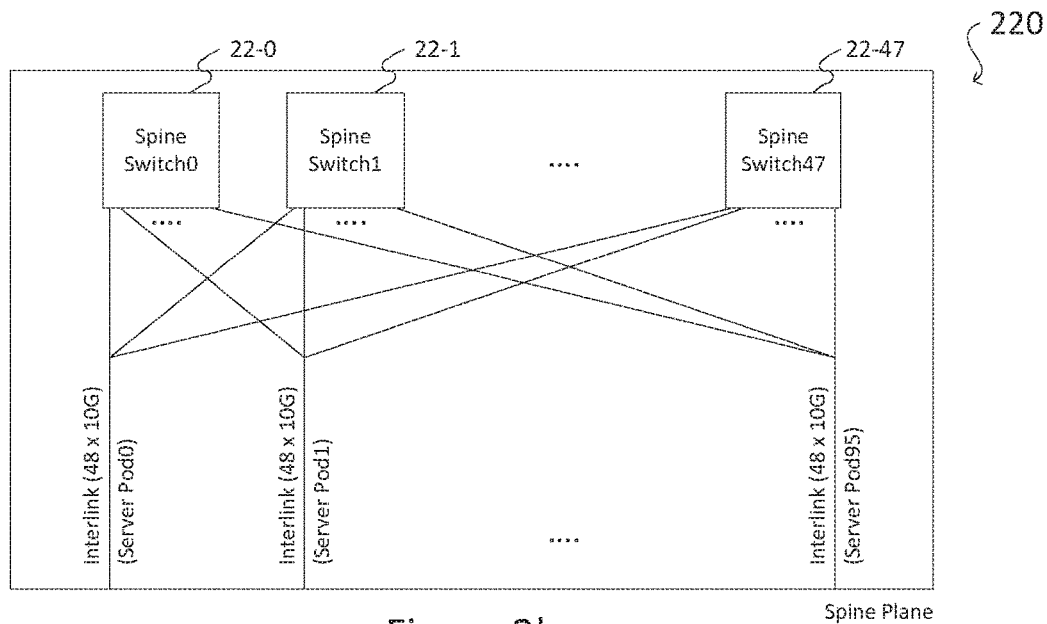
Figure 2b    Spine Plane

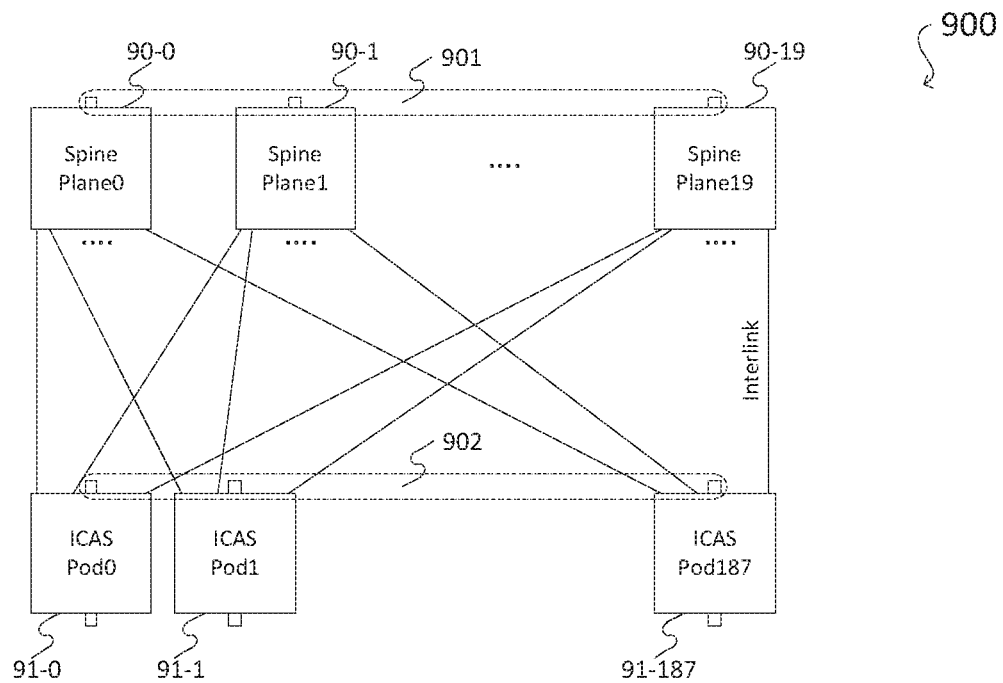
Figure 9a  ICAS-based Data Center
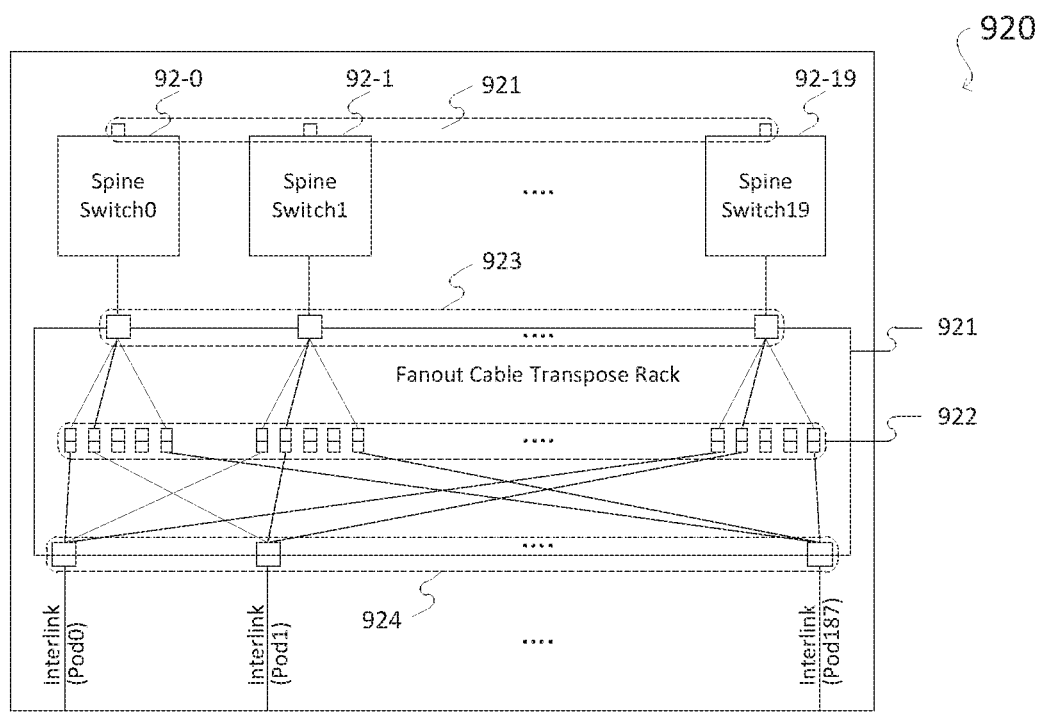
Figure 9b  Spine Plane

DATA CENTER INTERCONNECT AS A SWITCH

1. FIELD OF THE INVENTION

The present invention relates to organization of a data center computer network. In particular, the present invention relates to a passive interconnecting structure that can be used to replace certain fabric switches or to interconnect components of top-of-rack ("TOR") switches.

2. DISCUSSION OF THE RELATED ART

As a result of the recent rapid growth in application needs—in both size and complexity—today's network infrastructure is scaling and evolving at a high rate. Some of these applications needs relate to the increasing use of data analytic tools ("big data") and artificial intelligence ("AI"), for example. The data traffic that flows from a data center to the Internet—i.e., "machine-to-user" traffic is large, and ever increasing, as more people connect, and as new products and services are created. However, machine-to-user traffic is merely "the tip of the iceberg," when one considers the data traffic within the data center—i.e., "machine-to-machine" traffic—necessary to generate the machine-to-user data traffic. Generally, machine-to-machine data traffic is several orders of magnitude larger than machine-to-user data traffic.

The back-end service tiers and applications are distributed and logically interconnected within a data center. To service each user who uses an application program ("app") or a website, these back-end service tiers and applications rely on extensive real-time "cooperation" with each other to deliver the user's expected customized fast and seamless experience at the front end. To keep up with the demand, even though the internal applications are constantly being optimized to improve efficiency, the corresponding machine-to-machine traffic grows at an even faster rate than their continual optimization (e.g., at the current time, machine-to-machine data traffic is growing roughly faster than doubling every year).

To be able to move fast and to support rapid growth are goals that are at the core of data center infrastructure design philosophy. In addition, the network infrastructure within a data center ("data center network") must be simple enough as to be managed by a small, highly efficient team of engineers. It is desired that the data center network evolves in the direction that makes deploying and operating the network easier and faster over time, despite scale and exponential growth.

At the current time, data center networks have largely transitioned from layer-2 to all layer-3 (e.g., running Border Gateway Protocol (BGP) and Equal-cost Multi-Path (ECMP) protocols). A large-scale data center today is typically operating at tens of petabits-per-second scale (petascale) and expects growth into the hundreds of petabits-per-second scale in the near future. The cost of provisioning such a data center ranges from US$300 million to US$1.5 billion.

A review of our current state-of-the-art data center infrastructure is instructive. In the following context, data or traffic aggregation refers to multiplexing of communication frames or packets. Aggregation model and disaggregation model refer to topologies of communication networks. The concept of data aggregation is orthogonal to the concept of an aggregation or disaggregation model. Therefore, a disaggregation model can support data aggregation, as discussed below. A basic concept in data communication is that communication channels—also referred to as the transmission media—are error prone. Transmission over such communication channels at higher data rates and over large distances require complex and costly transceivers. Consequently, channel encoding, error detection and correction, and communication protocols are many techniques to ensure data is transmitted over long distances with accuracy. In the past, as data transmission was expensive, data aggregation (e.g., multiplexing from different data streams and multiplexing data from multiple topological sources) and data compression ensure even higher utilization of the communication channels and efficient management of the communication cost. This is the origin of the aggregation (i.e., in both data and topology) paradigm. This paradigm dominates the networking industry for decades. Such aggregation is widely used in wide area networks (WANs), where transmission cost dominates over other network costs. Today's hardware architecture for data switching is also based on aggregation, i.e., each interface is connected and aggregated from all other interfaces. In today's communication networks, data is typically aggregated before transmitting at an "uplink" to connect to external network (e.g., the Internet), which tends to be the most expensive port of the data switching equiptment. Due to both advances in semiconductor, fiber-optical, and interconnect technologies and economy of scale, network costs have reduced significantly. The aggregation model is not necessarily the only—or the most suitable—solution in a data center. In today's data center networks, where machine-to-machine traffic ("east-west traffic") dominates most of the bandwidth, being several orders of magnitude than the machine-to-user bandwidth, multipath topology and routing (ECMP) are deployed so that the combined network bandwidth is large. However, traffic is still aggregated from all incoming interfaces on to each outgoing interface. Nonetheless, the multipath topology signifies a disaggregation model. The detailed description below places a structure and quantification onto the multipath topology and discloses a disaggregation model, referred to herein as "interconnect as a Switch" ("ICAS"), which is significantly different from the more traditional aggregation model for data centers.

Typically, in an enterprise or intranet environment, communication patterns are relatively predictable with a modest number of data sources and data destinations. These data sources and data destinations are typically linked by a relatively small number of designated paths ("primary paths"), with some number of back-up or "secondary paths," which are provided primarily for fault tolerance. In such an environment, the routing protocols of the enterprise network are optimized to select a shortest single path between each source-destination pair in the absence of a failure.

Distributed computing frameworks (e.g., MapReduce, Hadoop and Dryad) and web services (e.g., web search, ecommerce, social networking, data analytics, artificial intelligence and scientific computing) bring a new paradigm of computing that requires both connections between a diverse range of hosts and significant aggregate bandwidths. Due to the scarcity of ports even in the high-end commercial switches, a common hierarchical network topology that has evolved is a fat-tree with higher-speed links and increasing aggregate bandwidths, as one moves up the hierarchy (i.e., towards the roots). The data center network, which requires substantial intra-cluster bandwidths, represents a departure from the earlier hierarchical network topology. In the multi-tooted tree, the shortest single-path routing protocol can significantly underutilize the available bandwidths. The ECMP is an improvement that statically stripes flows across available paths using flow hashing techniques. ECMP is standardized in the FEE 802.1Q Standard. ECMP allows "next-hop packet forwarding" to a single destination to occur over multiple "best paths," as symmetric insuring flows on deterministic paths. Multi-path routing can be used in conjunction with most routing protocols, because it is a per-hop decision limited to a single router. It can substantially increase bandwidth by load-balancing traffic over multiple paths. When a data packet of a data stream arrives at the switch, and multiple candidate paths are available for forwarding the data packet to its destination, selected fields of the data packet's headers are hashed to select one of the paths. In this manner, the flows are spread across multiple paths, with the data packets of each flow taking the same path, so that the arrival order of the data packets at the destination is maintained.

Note that ECMP performance intrinsically depends on both flow size and the number of flows arriving at a host. A hash-based forwarding scheme performs well in uniform traffic, with the hosts in the network communicating all-to-all with each other simultaneously, or in which individual flows last only a few round-trip delay times ("RTTs"). Non-uniform communication patterns, especially those involving transfers of large blocks of data, do not perform well under ECMP without careful scheduling of flows to avoid network bottlenecks.

In the detailed description below, the terms "fabric switch" and "spine switch" are used interchangeably. When both terms appear in a network, a fabric switch refers to a device in a network layer which is used for multipath networking among TOR devices, while a spine switch refers to a device in a higher network layer which is used for multipath networking among pods.

A fat-tree network suffers from three types of drawbacks—i.e., 1) congestion due to hash collision, 2) congestion due to an aggregation model, and 3) congestion due to a blocking condition. These congestions are further examined in the following.

First, under ECMP, two or more large, long-lived flows can hash to the same path ("hash collision"), resulting in congestion, as illustrated in FIG. 1a. FIG. 1a shows four fabric switches 10-0 to 10-3 connecting five TOR switches 11-0 to 11-4. As shown in FIG. 1a, each TOR switch has four ports, each communicating with a corresponding one of fabric switches 10-0 to 10-3. Each fabric switch has five ports, each communicating with a corresponding one of TOR switches 11-0 to 11-4. In FIG. 1a, two flows designating TOR switch 11-0 are sourced from TOR switches 11-1 and 11-2. However, by chance, each flow is hashed to a path that goes through fabric switch 10-0, which causes congestion at designating port 101 of fabric switch 10-0. (Of course, the congestion problem could have been avoided if one of the flows is hashed to a path that goes through fabric switch 10-1 for instance). Furthermore, the static mapping of the flows to paths by hashing does not consider either current network utilization or the sizes of the flows, so that the resulting collision overwhelms switch buffers, degrade overall switch utilization, and increases transmission latency.

Second, in a fat-tree network, the total bandwidth of the aggregated traffic can exceed the combined bandwidth of all downlinks of all the fabric switches, resulting in aggregation congestion, as illustrated in FIG. 1b. Such aggregation congestion is a common problem in the aggregation model of today's switching network, and requires detailed rate limiting to avoid congestion. In FIG. 1b, traffic designating TOR switch 13-0 is sourced from TOR switches 13-1 to 13-4 through fabric switches 12-0 to 12-3, except that the aggregated traffic from the sources (one source each from TOR switches 13-1 to 13-3 and two sources from TOR switch 13-4) exceeds the combined bandwidth of the downlinks from fabric switches 12-0 to 12-3. More specifically, traffic is spread out evenly over fabric switch 12-1 to 12-3 without congestion; traffic from TOR switches 13-1 and 13-4 exceeds the downlink bandwidth of port 121 of fabric switch 12-0 and thus causes congestion.

Third, there is a blocking condition called the "strict-sense blocking condition," which is applicable to statistically multiplexed flow-based networks (e.g., a TCP/IP network). The blocking condition results from insufficient path diversity (or an inability to explore path diversity in the network) when the number and the size of the flows become sufficiently large. FIG. 1c illustrates the blocking condition in a fat-tree network. As shown in FIG. 1c, the blocking condition occurs, for example, when paths from fabric switches 14-0 and 14-1 to TOR switch 15-0 are busy and paths from fabric switches 14-2 and 14-3 to TOR switch 15-3 are busy, and a flow which requires a path through TOR switch 15-0 arrives at TOR switch 15-3. An extra flow between TOR switch 15-0 and 15-3 can take one of 4 possible paths. Say it takes the path from TOR switch 15-3 to fabric switch 14-1 and then from fabric switch 14-1 to TOR switch 15-0. However, the path from fabric switch 14-1 to TOR switch 15-0 is busy already. Overall, multiplexing the blocked flow on to the existing flows results in increased congestion, latency and/or packet loss.

At the same time as the demand on the data center network grows, the rate of growth in CMOS circuit density ("Moore's law") and the I/O circuit data rate appear to have slowed. The cost of lithographic and heat density will ultimately limit how many transistors can be packed into a single silicon package. It is instructive to learn that a switching chip soldered on printed circuit board (PCB) employs high-speed serial differential I/O circuit to transmit and receive data to/from transceiver module. A transceiver module interconnects to a transceiver module on a different system to accomplish network communications. An optical transceiver performs the electrical-to-optical and optical-to-electrical conversion. An electrical transceiver performs complex electrical modulation and demodulation conversion. The primary obstacle that hinders high-speed operation on PCB is the frequency-dependent losses of the copper-based interconnection due to skin effects, dielectric losses, channel reflections, and crosstalk. Copper-based interconnection faces the challenge of bandwidth limit as the data rate exceeds several tens of Gb/s. To satisfy demands for bigger data bandwidth high-radix switch silicon integrates hundreds of differential I/O circuits. For example, Broadcom Trident-II chip and Barefoot Network Tofino chip integrate 2×128 and 2×260 differential I/O circuits for 10 Gbps transmit and receive respectively. To optimize system level port density, heat dissipation and bandwidth the I/O circuits and connections are gathered in groups and standardized in specifications on electrical and optical properties. For SFP+ it is a pair of TX and RX serial differential interfaces at 10 Gbps data rate per port. For QSFP it is four pairs (Quad) of TX and RX serial differential interfaces at 10 Gb/s data rate each for total of 40 Gb/s or 4×10 Gb/s data rate per port. For QSFP28 it is four pairs (Quad) of TX and RX serial differential interfaces at 25 Gb/s data rate each for total of 100 Gb/s or 4×25 Gb/s data rate per port. State of the art data centers and switch silicon are designed with 4 interfaces (TX, RX) at 10 Gb/s or 25 Gb/s each per port in mind. These groupings are not necessarily unique. MTP/MPO as an optical interconnect standard defines up to 48 interfaces per port where each interface contains a pair of optical fibers one for transmit and one for receive. However, the electrical and optical specifications of transceiver with up to 48 interfaces per module are yet to come. The definition of "port" in this patent disclosure is extended to include more interfaces crossing multiple QSFP's (e.g., 8 interfaces from 2 QSFP's; 32 interfaces from 8 QSFP's, etc.). A person experienced in the art can understands that this invention is applicable to other interconnect standards where multiple various number of interfaces other than 4 be grouped together in the future.

These limitations affect data center networks by, for example, increasing power consumption, slowing of performance increase, and increasing procurement cycle. These developments exacerbate the power needs for the equipment, as well as their cooling, facility space, the cost of hardware, network performance (e.g., bandwidth, congestion, and latency, management), and the required short time-to-build.

The impacts to network communication are several:
(a) the network industry may not have enough economy of scale to justify CMOS technology of a smaller footprint;
(b) simpler solutions should be sought to advance network technology, rather than to create more complex ones and packing more transistors;
(c) scale-out solutions (i.e., in complement to scale-up solution) should be sought to solve application problems (e.g., big-data, AI, HPC, and data center);
(d) the chip-interface density (i.e., the number of ports in the traditionally sense) can become flat[1]; and

[1] Integration of optical technology to the CMOS device may provide new opportunity. However, do not expect a very high-radix chip, which would allow network scalability, to emerge any time soon.

(e) signaling rate beyond 25G will not be realized anytime soon[2].

[2] One must think beyond the aggregation model (e.g., the disaggregation model) to meet new network challenges.

Historically, high-speed networks belong to two main design spaces. In the first design space, HPC and supercomputing networks typically adopt direct network topologies. In a direct network topology, every switch is connected to servers, as well as other switches in the topology. Popular topologies include mesh, torus, and hypercube. This type of network is highly resource efficient and offers high capacity through numerous variable-length paths between a source and destination. However, the choice of which path to forward traffic over is ultimately controlled by proprietary protocols (i.e., non-minimum routing) in switches, NICs, and by the end-host application logic. Such routing protocols increase the burden on the developer and create a tight coupling between applications and the network.

In the second design space, data centers scaling-out have resulted in the development of indirect network topologies, such as folded-Clos and multi-rooted trees ("fat-trees"), in which servers are restricted to the edges of the network fabric. The interior of the network fabric consists of dedicated switches that are not connected to any servers, but simply route traffic within the network fabric. Data center networks of this type thus have a much looser coupling between applications and network topology, placing the burden of path selection on the network switches themselves. Given the limited resources and memory available in commodity switches, data center networks have historically relied on relatively simple mechanisms for path selection (e.g., ECMP).

ECMP relies on static hashing of flows across a fixed set of shortest equal cost paths to a destination. For hierarchical topologies (e.g., fat-tree), ECMP routing has been largely sufficient when there are no failures. However, recently direct network topologies (e.g., Dragonfly, HyperX, Slim Fly, BCube, and Flattened Butterfly), which employ paths of different lengths, have not seen adoption in data centers because of the limitations imposed by both commodity data center switches and the widespread adoption of ECMP routing in data center networks. ECMP is wasteful of network capacity when there is localized congestion or hot-spots, as it ignores uncongested longer paths. Further, even in hierarchical networks, ECMP makes it hard to route efficiently in the presence of failures, and when the network is no longer completely symmetric, and non-shortest paths are available for improving network utilization. Because of these limitations, hierarchical networks have been adopted in data centers. Even then, higher level adaptive protocols like multi-path TCP (MPTCP) are unable to take advantage of the full capacity of direct networks because all paths are not exposed to them through routing or forwarding tables.

The convergence of big data, AI and HPC can spur innovations of new routing protocol and new network fabric. For example, to provide flow control, Infiniband (IB) is an industry-standard architecture for server input/output and inter-server communication, often used in HPC environments. Unlike Ethernet, IB is intended to be a lossless fabric, as IB switches do not drop data packets for flow control reasons unless there is a hardware failure or malformed packets. Instead, IB uses a system of credits for flow control. Communication occurs between IB endpoints, which in turn are issued credits based on the amount of buffer space the receiving device has. If the credit cost of the data to be transmitted is less than the credits remaining on the receiving device, the data is transmitted. Otherwise, the transmitting device holds on to the data until the receiving device has accumulated sufficient credits. Such a flow control scheme works well for normal loads on well-balanced, non-oversubscribed IB fabrics. However, if the fabric is unbalanced, oversubscribed or just heavily loaded, some links may be oversaturated with traffic beyond the ability of the credit mechanism to sustain. Making sure that credit messages are not lost during transmission is crucial. Therefore, IB requires detailed tuning to be lossless.

Under adversarial traffic conditions, an IB network can be very congested and latency can be high. Although IB is among the most common and well-known cluster interconnect technologies, the complexities of an IB network can frustrate the most experienced cluster administrators. Maintaining a balanced fabric topology, dealing with underperforming hosts and links, and chasing potential improvements keeps all of us on our toes. Sometimes, though, a little research and experimentation can find unexpected performance and stability gains.

Ethernet, which relies on retransmission when packet delivery is not acknowledged, started as a fool-proof technology. It is highly successful, reaching enormous economical scale and low cost. To satisfy better requirements from enterprise, data center and HPC environments, additional features augment the Ethernet (e.g., RDMA Converged Ethernet (RoCE)). RoCE, which is intended to be lossless, is an alternative to IB in the HPC segment.

While IB represents a state-of-the-art interconnect technology for HPC computing, it is still based on an aggregation model. As explained below, the principles of the present invention may be applied to IB-based switch devices to build a more cost effective IB-based network for HPC computing. Today, IB divides the HPC market with the contending Ethernet technology and has limited application to AI/GPU server-level interconnect. A GPU server can be viewed as a GPU-cluster containing tens of GPU's interconnected in a single server box. Due to low latency requirement and vast amount of bandwidth flowing between GPU's, interconnect at the GPU server level can be extremely challenging.

As discussed above, big data and AI have become very significant distributed applications. Servicing these applications require handling large amounts of data (e.g., petabytes), using great computation power (e.g., petaflops), and achieving very low latency (e.g., responses that become available within 100 ns). Simultaneously providing more powerful processors ("scaling-up") and exploiting greater parallel processing ("scaling-out") have been the preferred approach to achieve performance. Unlike scientific computation, however, big-data and AI applications are delivered in the form of services to large numbers of users across the world. Thus, like web servers for web services, clusters of servers dedicated to big data and AI applications have become significant parts of the data center network.

FIG. 2a shows an architecture of a typical state-of-the-art data center network, organized by three layers of switching devices—i.e., "top-of-rack" (TOR) switches and fabric switches implemented in 96 server pods 21-0 to 21-95 and spine switches implemented in 4 spine planes 20-0 to 20-3 interconnected by interlinks in a fat-tree topology. Details of a spine plane is shown in FIG. 2b where a spine plane consists of 48 spine switches 22-0 to 22-47 each connecting to 96 server pods. The connections from all 48 spine switches are grouped into 96 interlinks, with each interlink including a connection from each spine switch 22-0 to 22-47, for a total of 48 connections per interlink. Details of a server pod is shown in FIG. 2c, in which a server pod is shown to consist of 48 TOR switches 24-0 to 24-47 and 4 fabric switches 23-0 to 23-3, with each TOR switch connected to all 4 fabric switches. Combining the connection information from FIG. 2b, each fabric switch in the server of FIG. 2c connects to all 48 of the spine switches 22-0 to 22-47 in the corresponding spine plane through an interlink. (Fabric switches 23-0 to 23-3 connect to 4 spine planes through 4 interlinks of the server pod. Each TOR switch provides 48×10G connections in 12×QSFP interfaces as downlink to connect to servers. An edge pod is shown in FIG. 2d, details will be given in below.

As shown in FIGS. 2b and 2c, and in conjunction with FIG. 2a, the TOR, fabric and spine layers of switches include: (a) a TOR switch layer consisting of 96×48 TOR switches which connect the servers in the data center and which are equally distributed over 96 "server pods"; (b) a spine switch layer consisting of 4×48 spine switches equally distributed over the 4 "spine planes"; and (c) a fabric layer consisting of 96×4 fabric switches, also equally distributed over the 96 server pods. In addition, two of the server pods can be converted to two edge pods. FIG. 2d shows an edge pod. As shown in FIG. 2d, edge pod 250 may consist of four edge switches 25-0 to 25-3, with each edge switch on each edge pod connected to all 48 spine switches on a corresponding spine plane through an interlink. Each edge switch may include one or more uplinks that interconnect an external network.

Details of an implementation of the server and spine pods are further described below in FIG. 2c, 2b in relation to FIG. 2a. This configuration modularizes by having each fabric, or spine switch housed in an 8U switching chassis with 96 QSFP network interfaces. As shown in FIG. 2c, each TOR switch is implemented by a 16-QSFP switch, which allocates 12 QSFPs for 10G-connections to the servers (i.e., downlinks) and four QSFPs for four 40G-connections to the four fabric switches in the same server pod. (In this detailed description, a QSFP represents a 40 Gbits/second bandwidth, which can be provided in a single 40G-connection or four 10G-connections, each 40G-connection including four receive-transmit pairs of optical fibers and each 10G-connection including a receive-transmit pair of optical fibers). The 40G-connection between a TOR switch and a fabric switch is used for both intra-pod and inter-pod data traffic.

Each fabric switch in a server pod is implemented by a 96-QSFP switch, which allocates (i) 48 QSFPs in 48 40G-connections with the 48 TOR switches in the server pod in a fat-tree topology, and (ii) 48 QSFPs in 48 40-G connections to the 48 spine switches in the single spine plane the fabric switch is connected.

Each spine switch in a spine plane is also implemented by a 96-QSFP switch, which provides all 96 QSFPs in 96 40-G connections with the 96 fabric switches connected to the spine plane, one from each of the 96 server pods. The data traffic through the spine plane represents inter-pod communications mostly for the server pods.

In the configuration of FIG. 2a, each server pod includes (i) 384 QSFP transceivers, half of which are provided to the spine planes and half of which are provided to the network side of the fabric switches, (ii) 192 QSFP transceivers provided to the network side of the TOR switches, (iii) 576 transceivers provided to the servers; (iv) 192 optical QSFP cables, (v) 36 application-specific integrated circuits (ASICs), which implements the fabric switches and (vi) 48 ASICs, which implements the TOR switches. The ASIC suitable for this application may be, for example, the Trident-II Ethernet Switch ("Trident H ASIC"). Each spine plane includes 4608 QSFP transceivers, 4608 optical QSFP cables and 432 Trident II ASICs.

The implementation of FIG. 2a provides in practice improved congestion performance but does not eliminate congestion. The network organization is based on an intensive aggregation model, intended to improve cost and utilization of communication interface and transmission media under the aggregation model. While this aggregation model may still be valuable for wide-area networks (e.g., the Internet), recent advances of semiconductor technology and economic of scale have call this aggregation model into question, when applied to local area networks.

SUMMARY

According to one embodiment of the present invention, an interconnect module ("ICAS module") includes n optical data ports each comprising n−1 optical interfaces, and an interconnecting network implementing a full mesh topology for interconnecting the optical interfaces of each port each to a respective one of the optical interfaces of each of the other ports. In one embodiment the n−1 optical interfaces are conveniently divided in multiple QSFP interfaces. The interconnecting module may implement the full mesh topology using optical fibers.

According to one embodiment of the present invention, a data center network having data interfaces for connecting to servers and routing their data signals among them may include (i) a first plurality of data switching units ("server pods") each including (a) first level interconnecting devices ("TOR switches") providing a subset of the data interfaces; and (b) one or more second level interconnecting devices routing data signals of the subset of data signals among the subset of data interfaces of the server pods and a data interface with an external network, wherein the first and second level interconnecting devices are interconnected to implement a full mesh network of a predetermined number of nodes; and (ii) a second plurality of data switching units ("spine planes"), wherein each spine plane includes third level interconnecting devices ("spine switches"), wherein each spine switch routes data signals exchanged with a corresponding one of the TOR switches in each of the server pods.

In one implementation, the second level interconnecting devices may be a set of fabric switches. In that context, the full mesh network is achieved using the predetermined number of TOR switches and the predetermined number less one fabric switches.

Alternatively, the second level interconnecting devices in each server pod may be implemented by a module interconnecting the TOR switches with QSFP straight cables.

According to one embodiment of the present invention, the spine switches in a spine plane may be implemented by a combination of switching elements and ICAS modules. In one implementation the switching elements and the ICAS modules may each be housed in a stackable unit to attain scalability and to facilitate management and network expansion.

By simplifying the data center network infrastructure and reducing the hardware required, The present invention addresses the problems relating to the power needs for the equipment and their cooling, facility space, the cost of hardware, network performance (e.g., bandwidth, congestion, and latency, management), and the required short time-to-built.

The present invention is better understood upon consideration of the detailed description below in conjunction with the accompanying drawings.

BRIEF DESCRIPTION OF THE DRAWINGS

FIG. 2a shows the architecture of a state-of-the-art data center network.

FIG. 2b shows in detail an implementation of a spine plane of the data center network of FIG. 2a.

FIG. 6a shows network 600, which is a more compact representation of the network of FIG. 5a.

FIG. 9a shows ICAS-based data center network 900, achieved by replacing the server pods of network 800 of FIG. 8a (e.g., server pod 830 of FIG. 8c) with ICAS pods 91-0 to 91-197, each ICAS pod being shown in greater detail in FIG. 9c, according to one embodiment of the present invention; in FIG. 9a, optional uplinks 901, shared by 20 spine planes, and optional uplinks 902, shared by 188 ICAS pods are provided for connecting to an external network.

FIG. 9b shows in detail spine plane 920, which implements one of the spine planes in data center network 900 and which is achieved by integrating a fanout cable transpose rack into spine plane 820 of FIG. 8b, according to one embodiment of the present invention; the spine switches in spine plane 920 provide optional uplink 921 for connecting to an external network.

To facilitate cross-referencing among the figures and to simplify the detailed description, like elements are assigned like reference numerals.

DETAILED DESCRIPTION OF THE PREFERRED EMBODIMENTS

Figure 3:
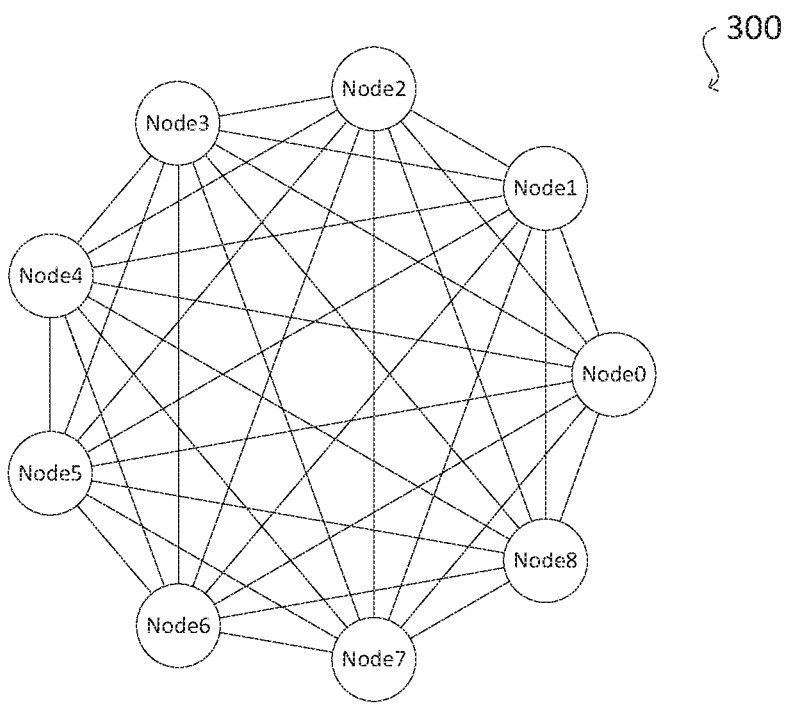
FIG. 3 illustrates a "full mesh" topology in a network of 9 nodes.

The present invention simplifies the network architecture by eliminating the switches in the fabric layer based on a new fabric topology, referred herein as the "interconnect-as-a-switch" (ICAS) topology. The ICAS topology of the present invention is based on the "full mesh" topology. In a full mesh topology, each node is connected to all other nodes. The example of a 9-node full mesh topology is illustrated in FIG. 3. The inherent connectivity of a full mesh network can be exploited to provide fabric layer switching.

Figure 4A:
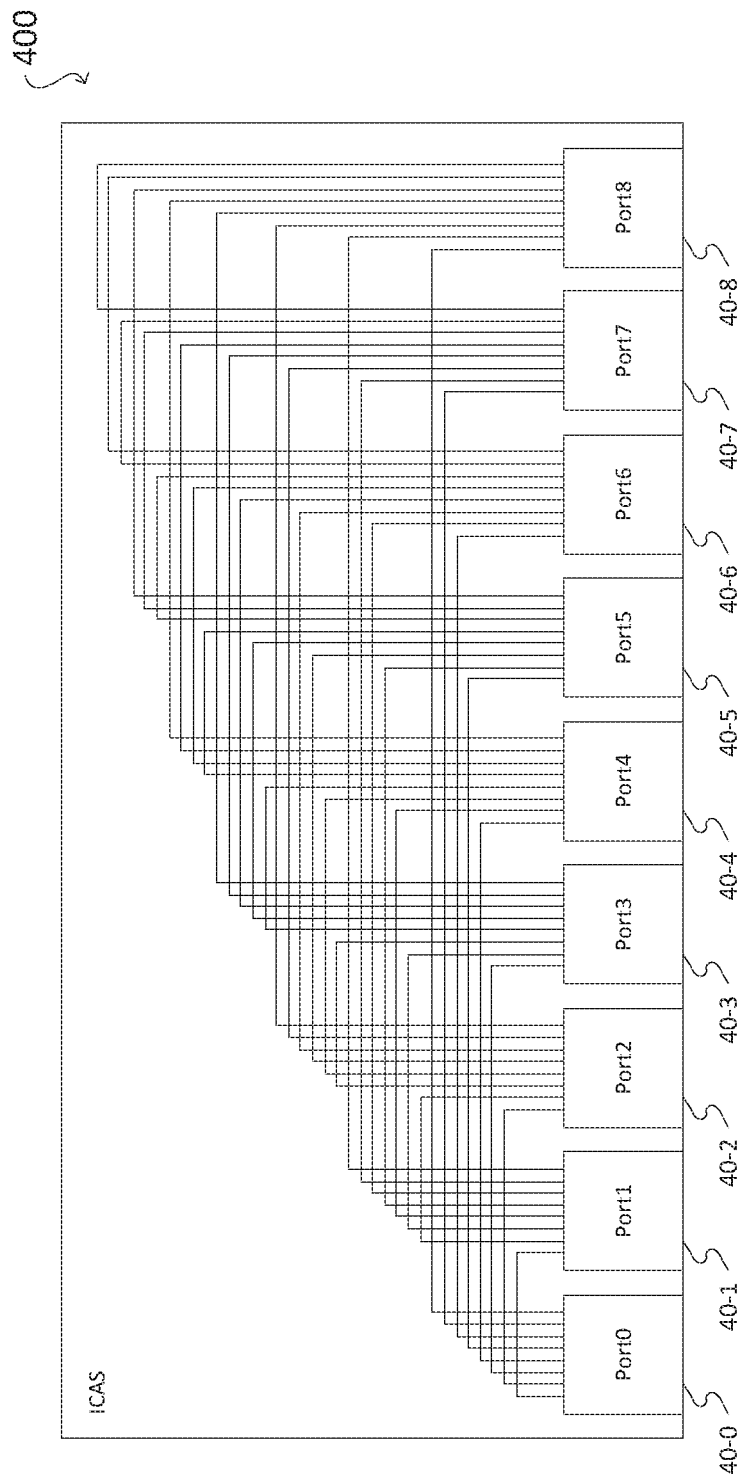
FIG. 4a shows ICAS module 400, which interconnects 9 nodes, according to the full mesh topology of FIG. 3.

As discussed in further detail below, the ICAS topology enables a data center network that is far superior than a network of the fat-tree topology used in prior art data center networks. Unlike other network topologies, the ICAS topology imposes a structure on the network which avoids congestion, while allowing aggregation of traffic using a multipath routing scheme (e.g., ECMP). According to one embodiment, the present invention provides an ICAS module as a component for interconnecting communicating devices. FIG. 4a shows ICAS module 400, which interconnects 9 nodes according to the full mesh topology of FIG. 3.

FIG. 4a shows ICAS module 400 having ports 40-0 to 40-8 each providing 8 external connections and 8 internal connections. In ICAS module 400, each internal connection of each port connects to a corresponding internal connection of another port. In fact, each port is connected to every one of the other ports through exactly one internal connection. In this context, each "connection" includes a receive-transmit pair of optical fibers capable of, for example, a 10 Gbits per second data rate. In FIG. 4a, the internal connections for port i are indexed from 0-8, except index i is skipped. (For example, the internal connections for port 7 are 0, 1, 2, 3, 4, 5, 6 and 8.). Furthermore, internal connection j of port i is connected to internal connection i of port j. The external connections for each port of ICAS module 400 are indexed sequentially as 0-7.

Figure 4B:
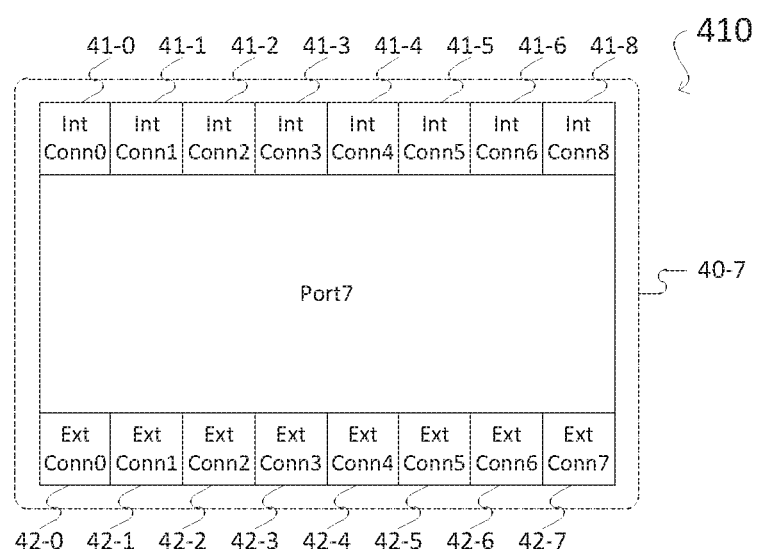
FIG. 4b illustrates the connections between the internal connections and the external connections of port 7 of the 9-node ICAS module 400, in accordance with one embodiment of the present invention.

FIG. 4b illustrates in detail the connections between the internal connections and the external connections of a port 7 in ICAS module 400, in accordance with the present invention. As shown in FIG. 4b, the external connections are connected one-to-one to the internal connections in index order. (For example, for port 7, external connections 42-0 to 42-7 are connected in index order to internal connections 41-0 to 41-6 and 41-8.) Thus, in FIGS. 4a and 4b, for port i, external connections 0-7 connect, respectively, to internal connections 0, . . . , 8. Thus, as can be easily seen from FIGS. 4a and 4b, any pair of ports x and y are connected through internal connection x of pony and internal connection y of port x. This indexing scheme allows an external switching device to assign routes for data packets using the internal port indices of the source and destination ports. No congestion condition (e.g., due to hash collision, aggregation model, or strict-sense blocking) can occur between any pair of ports.

As switching in ICAS module 400 is achieved passively by its connectivity, no power is dissipated in performing the switching function. Typical port-to-port delay through an ICAS passive switch is around 10 ns 5 ns/meter, for an optical fiber), making it very desirable for a data center application, or for big data, AI and HPC environments.

The indexing scheme of external-to-internal connections in ICAS module 400 of FIG. 4a is summarized in Table 1 below:

TABLE 1

| ICAS Port | ICAS External Connection | | | | | | | |
|---|---|---|---|---|---|---|---|---|
| | 0 | 1 | 2 | 3 | 4 | 5 | 6 | 7 |
| 0 | 1 | 2 | 3 | 4 | 5 | 6 | 7 | 8 |
| 1 | 0 | 2 | 3 | 4 | 5 | 6 | 7 | 8 |
| 2 | 0 | 1 | 3 | 4 | 5 | 6 | 7 | 8 |
| 3 | 0 | 1 | 2 | 4 | 5 | 6 | 7 | 8 |
| 4 | 0 | 1 | 2 | 3 | 5 | 6 | 7 | 8 |
| 5 | 0 | 1 | 2 | 3 | 4 | 6 | 7 | 8 |
| 6 | 0 | 1 | 9 | 3 | 4 | 5 | 7 | 8 |
| 7 | 0 | 1 | 2 | 3 | 4 | 5 | 6 | 8 |
| 8 | 0 | 1 | 2 | 3 | 4 | 5 | 6 | 7 |

Figure 5A:
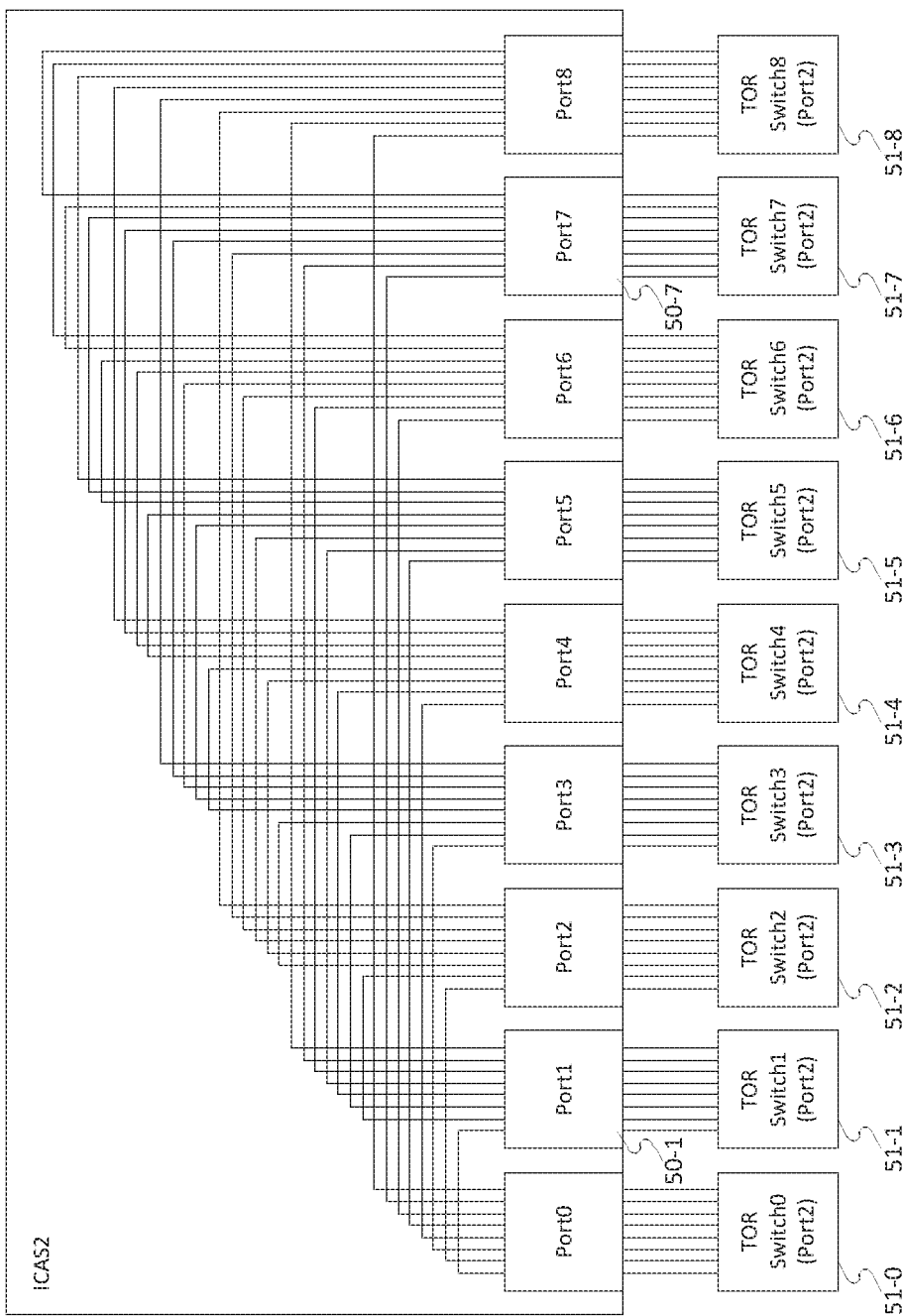
FIG. 5a shows ICAS module 500 connecting port 2 of each of TOR switches 51-0 to 51-8 in a full mesh topology network 500, in accordance with one embodiment of the present invention.

FIG. 5a shows network 500, in which ICAS module 400 connects port 2 of each of TOR switches 51-0 to 51-8 in a full mesh topology, in accordance with one embodiment of the present invention.

Figure 5B:
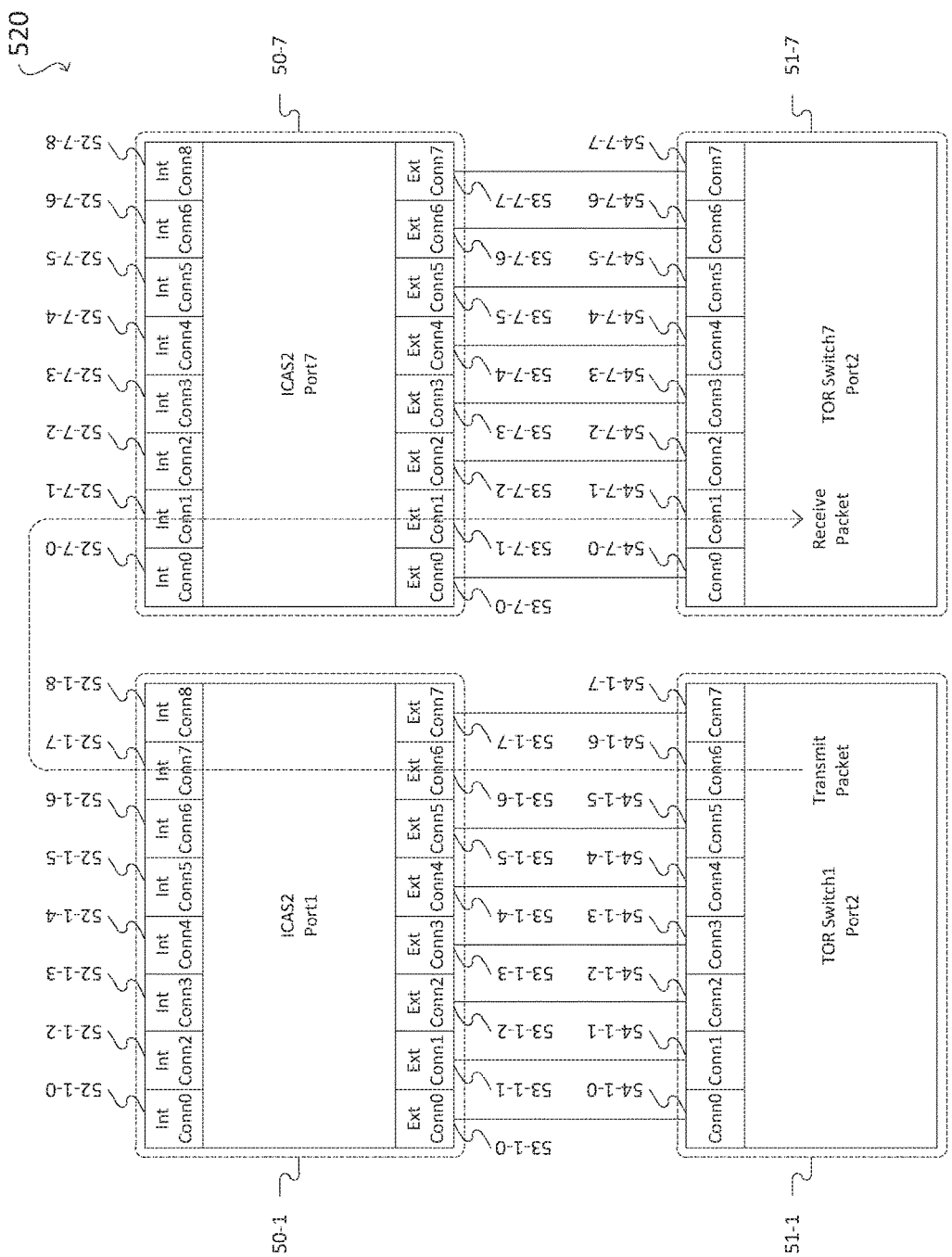
FIG. 5b illustrates, in the full mesh topology network 500 of FIG. 5a, port 2 of TOR switch 51-1 routing a data packet to port 2 of TOR switch 51-7 through internal connection 52-1-7 of port 50-1 and internal connection 52-7-1 of port 50-7 of ICAS2 module 500, in accordance with one embodiment of the present invention.

FIG. 5b illustrates, in the full mesh topology network 500 of FIG. 5a, TOR switch 51-1 routing a data packet to TOR switch 51-7 through external connection 53-1-6 and internal connection 52-1-7 of port 50-1, and internal connection 52-7-1 and external connection 53-7-1 of port 50-7, within ICAS module 400, in accordance with one embodiment of the present invention. As shown in FIG. 5b, TOR switch 51-1, which is connected to port 50-1 of ICAS module 400, receives a data packet with a destination reachable through internal port 52-1-7 of ICAS module 400. TOR switch 51-1 has a port that includes 8 connections 54-1-0 to 54-1-7 (provided as two QSFP port) mapping one-to-one to external connections 53-1-0 to 53-1-7 of port 50-1 of ICAS module 400, which in turn maps one-to-one to internal connections 52-1-0, 52-1-2 to 52-1-8 in sequential order of port 50-1 of ICAS module 400. TOR switch 51-7 has a port that includes 8 connections 54-7-0 to 54-7-7 (provided as two QSFP port) mapping one-to-one to external connections 53-7-0 to 53-7-7 of port 50-7 of ICAS module 400, which in turn maps one-to-one to internal connections 52-7-0 to 52-7-6 and 52-7-8 in sequential order of port 50-7 of ICAS module 400. Each connection in a TOR switch port may be a 10-G connection, for example. As ports 50-1 and 50-7 of ICAS module 400 are connected through the ports' respective internal connections 52-1-7 and 52-7-1, TOR switch 51-1 sends the data packet through its connection 54-1-6 to external connection 53-1-6 of ICAS module 400. Because of the full mesh topology in the connections within ICAS module 400, the data packet is routed to external connection 53-7-1 of ICAS module 400.

In full mesh topology network 500, the interfaces of each TOR switch is divided into ports, such that each port contains 8 interfaces (connections). To illustrate this arrangement, port 2 from each TOR switch connects to ICAS module 400. As each TOR switch has a dedicated path through ICAS module 400 to each of the other TOR switches, no congestion can result from two or more flows from different source switches being routed to the same destination switch (the "Single-Destination-Multiple-Source Traffic Aggregation" case). In that case, for example, when TOR switches 51-0 to 51-8 each have a 10-G data flow that has TOR switch 51-0 as destination, all the flows would be routed on paths through respective connections. Table 2 summarizes the separate designated paths:

TABLE 2

| Source | ICAS Source Internal | ICAS Destination Internal | Destination |
|---|---|---|---|
| T1.p2.c0 ↔ | ICAS2.p1.c0 ↔ | ICAS2.p0.c1 ↔ | T0.p2.c0 |
| T2.p2.c0 ↔ | ICAS2.p2.c0 ↔ | ICAS2.p0.c2 ↔ | T0.p2.c1 |
| T3.p2.c0 ↔ | ICAS2.p3.c0 ↔ | ICAS2.p0.c3 ↔ | T0.p2.c2 |
| T4.p2.c0 ↔ | ICAS2.p4.c0 ↔ | ICAS2.p0.c4 ↔ | T0.p2.c3 |
| T5.p2.c0 ↔ | ICAS2.p5.c0 ↔ | ICAS2.p0.c5 ↔ | T0.p2.c4 |
| T6.p2.c0 ↔ | ICAS2.p6.c0 ↔ | ICAS2.p0.c6 ↔ | T0.p2.c5 |
| T7.p2.c0 ↔ | ICAS2.p7.c0 ↔ | ICAS2.p0.c7 ↔ | T0.p2.c6 |
| T8.p2.c0 ↔ | ICAS2.p8.c0 ↔ | ICAS2.p0.c8 ↔ | T0.p2.c7 |

In Table 2 (as well as in all Tables herein), the switch source and the switch destination are each specified by 3 values: $Ti.p_k.c_k$, where $T_i$ is the TOR switch with index i, $p_j$ is the port with port number j and $c_k$ is the connection with connection number k. Likewise, the source and destination connections in module 500 are also each specified by 3 values: $ICASj.p_i.c_k$, where ICASj is the ICAS module with index j, $p_i$ is the port with port number i and $c_k$ is the internal or external connection with connection number k.

An ICAS-based network is customarily allocated so that when its ports are connected to port i from all TOR switches the ICAS will be labeled as ICASi with index i.

Congestion can also be avoided in full mesh topology network 500 with a suitable routing method, even when a source switch receives a large burst of aggregated data (e.g., 80 Gbits per second) from all its connected servers to be routed to the same destination switch (the "Port-to-Port Traffic Aggregation" case). In this case, it is helpful to imagine the TOR switches as consisting of two groups: the source switch i and the rest of the switches 0 to i−1, i+1 to 8. The rest of the switches are herein collectively referred to as the "spine group". Suppose TOR switch 51-1 receives 80 Gbits per second (e.g., 8 10G flows) from all its connected servers all designating to destination TOR switch 51-0. The routing method for the Port-to-Port Traffic Aggregation case allocates the aggregated traffic to its 8 10G-connections with port 51-1 of ICAS module 500, such that the data packets in each 10G-connection is routed to a separate TOR switch in the spine group (Table 3A):

TABLE 3A

| Source | ICAS Source Internal | ICAS Destination Internal | Destination |
|---|---|---|---|
| T1.p2.c0 ↔ | ICAS2.p1.c0 ↔ | ICAS2.p0.c1 ↔ | T0.p2.c0 |
| T1.p2.c1 ↔ | ICAS2.p1.c2 ↔ | ICAS2.p2.c1 ↔ | T2.p2.c1 |
| T1.p2.c2 ↔ | ICAS2.p1.c3 ↔ | ICAS2.p3.c1 ↔ | T3.p2.c1 |
| T1.p2.c3 ↔ | ICAS2.p1.c4 ↔ | ICAS2.p4.c1 ↔ | T4.p2.c1 |
| T1.p2.c4 ↔ | IC AS2.p1.c5 ↔ | ICAS2.p5.c1 ↔ | T5.p2.c1 |
| T1.p2.c5 ↔ | ICAS2.p1.c6 ↔ | ICAS2.p6.c1 ↔ | T6.p2.c1 |
| T1.p2.c6 ↔ | ICAS2.p1.c7 ↔ | ICAS2.p7.c1 ↔ | T7.p2.c1 |
| T1.p2.c7 ↔ | ICAS2.p1.c8 ↔ | ICAS2.p8.c1 ↔ | T8.p2.c1 |

Note that the data routed to TOR switch 51-0 has arrived its designation and therefore would not be routed further. Each TOR switch in the spine group, other than TOR switch 51-0, then allocates its 10G-connection to connection 0 for forwarding its received data to TOR switch 51-0 (Table 3B):

TABLE 3B

| Source | ICAS Source Internal | ICAS Destination Internal | Destination |
|---|---|---|---|
| — ↔ | — ↔ | — ↔ | — |
| T2.p2.c0 ↔ | ICAS2.p2.c0 ↔ | ICAS2.p0.c2 ↔ | T0.p2.c1 |
| T3.p2.c0 ↔ | ICAS2.p3.c0 ↔ | ICAS2.p0.c3 ↔ | T0.p2.c2 |
| T4.p2.c0 ↔ | ICAS2.p4.c0 ↔ | ICAS2.p0.c4 ↔ | T0.p2.c3 |
| T5.p2.c0 ↔ | ICAS2.p5.c0 ↔ | ICAS2.p0.c5 ↔ | T0.p2.c4 |
| T6.p2.c0 ↔ | ICAS2.p6.c0 ↔ | ICAS2.p0.c6 ↔ | T0.p2.c5 |
| T7.p2.c0 ↔ | ICAS2.p7.c0 ↔ | ICAS2.p0.c7 ↔ | T0.p2.c6 |
| T8.p2.c0 ↔ | ICAS2.p8.c0 ↔ | ICAS2.p0.c8 ↔ | T0.p2.c7 |

Thus, the full mesh topology network of the present invention provides performance that is in stark contrast to prior art network topologies (e.g., fat-tree), in which congestions in the source or destination switches cannot be avoided under Single-Destination-Multiple-Source Traffic Aggregation and Port-to-Port Traffic Aggregation cases.

Also, as discussed above, when TOR switches 51-0 to 51-8 abide by the rule m≤2n−2, where m is the number of network-side connections (e.g., the connections with a port in ICAS module 500) and n is the number of the TOR switch's input connections (e.g., connections to the servers within the data center), a strict blocking condition is avoided. In other words, a static path is available between any pair of input connections under any traffic condition. Avoiding such a blocking condition is essential in a circuit-switched network but is rarely significant in a flow-based switched network.

Figure 6A:
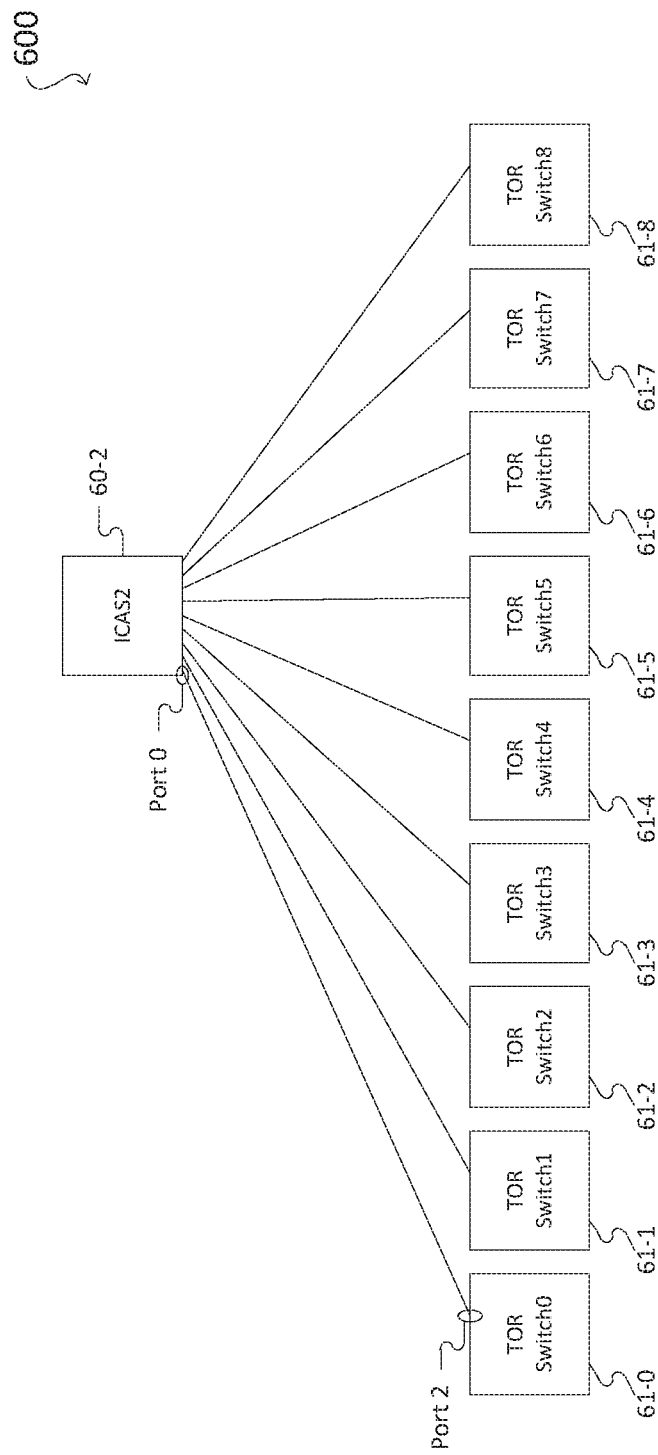
Figure 6B:
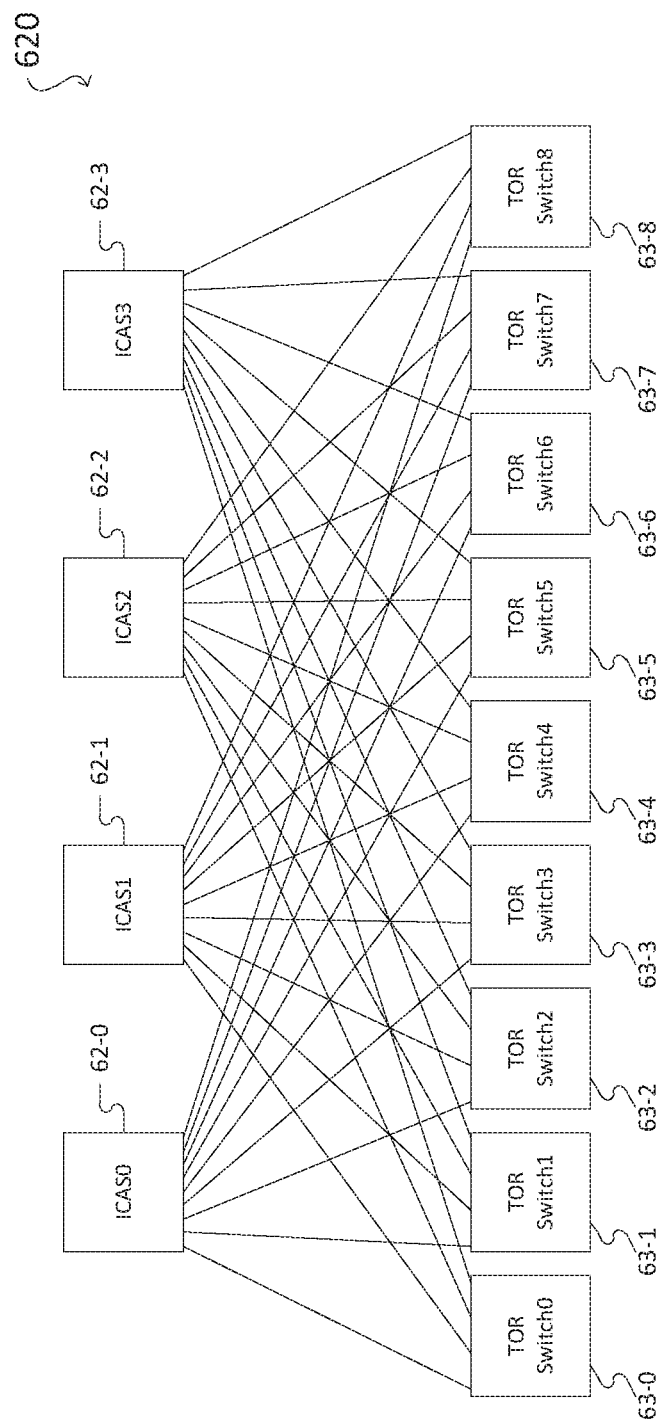
FIG. 6b shows network 620, after additional ICAS modules are added to network 600 of FIG. 6a, so as to provide greater bandwidth and path diversity.

In the full mesh topology network 500 of FIG. 5a, each port of ICAS module 500 has 8 connections connected to an 8-connection port of a corresponding TOR switch (e.g., 8 10-G connections) Full mesh topology network 500 of FIG. 5a may be redrawn in a more compact form in FIG. 6a, with a slight modification. FIG. 6a illustrates ICAS2 module 60-2 interconnecting to port 2 of each of TOR switches 61-0 to 61-8. In FIG. 6a, the connections between port 2 of TOR switch 61-0 and port 0 of ICAS module 60-2 (now labeled ICAS2') are represented as a single line (e.g., the single line between port 2 of TOR switch 61-0 and port 0 of ICAS module 60-2). Such a line, of course, represents all 8 eight connections between the TOR switch and a corresponding port in ICAS module 60-2. This is exactly the case in FIG. 6b where each TOR switch 63-0 to 63-8 is shown also to have 4 ports, to allow configuring network 620 of FIG. 6b, where three additional ICAS modules 62-0, 62-1 and 62-3 in addition to 62-2 and respective connections are added to network 600 of FIG. 6a.

In full mesh topology network 500, uniform traffic may be spread out to the spine group and then forwarded to its destination. In network 620 of FIG. 6b, the additional ICAS modules may be used to provide greater bandwidth. So long as the additional ports are available in the TOR switches, additional ICAS modules may be added to the network to increase path diversity and bandwidth.

Figure 1A:
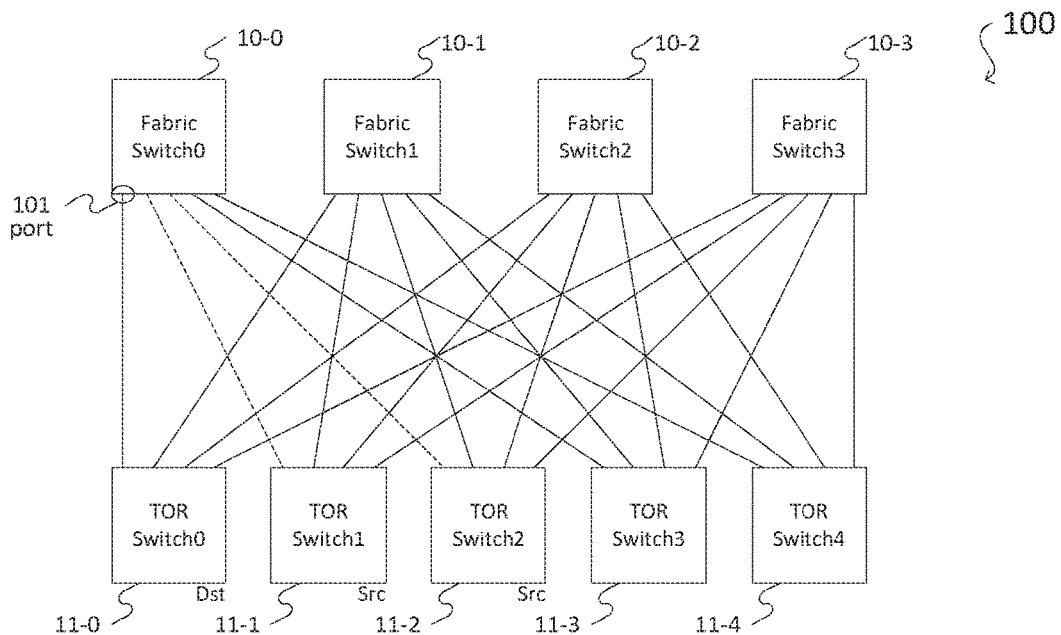
FIG. 1a illustrates congestion due to hash collision in a fat-tree network under ECMP.
Figure 1B:
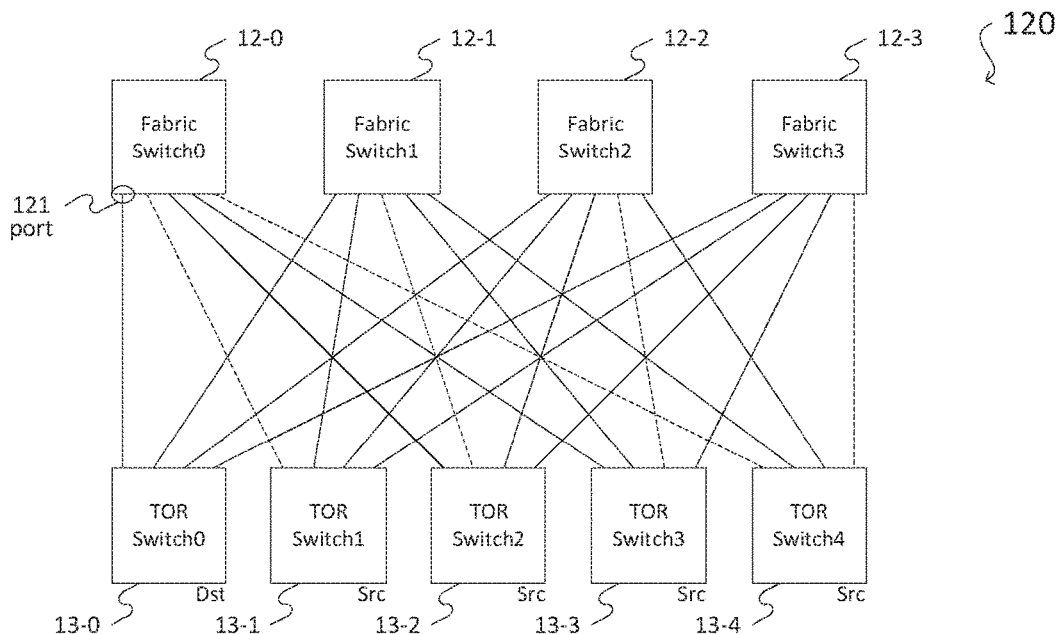
FIG. 1b illustrates aggregation congestion in a fat-tree network topology.
Figure 1C:
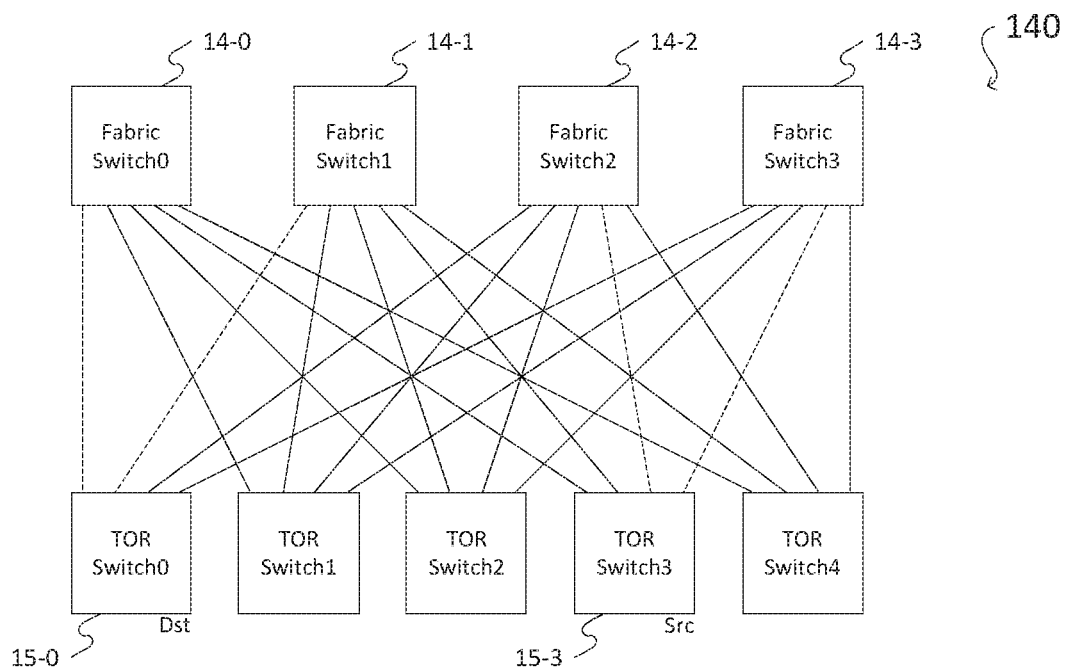
FIG. 1c illustrates congestion due to blocking condition in a fat-tree network.
Figure 2C:
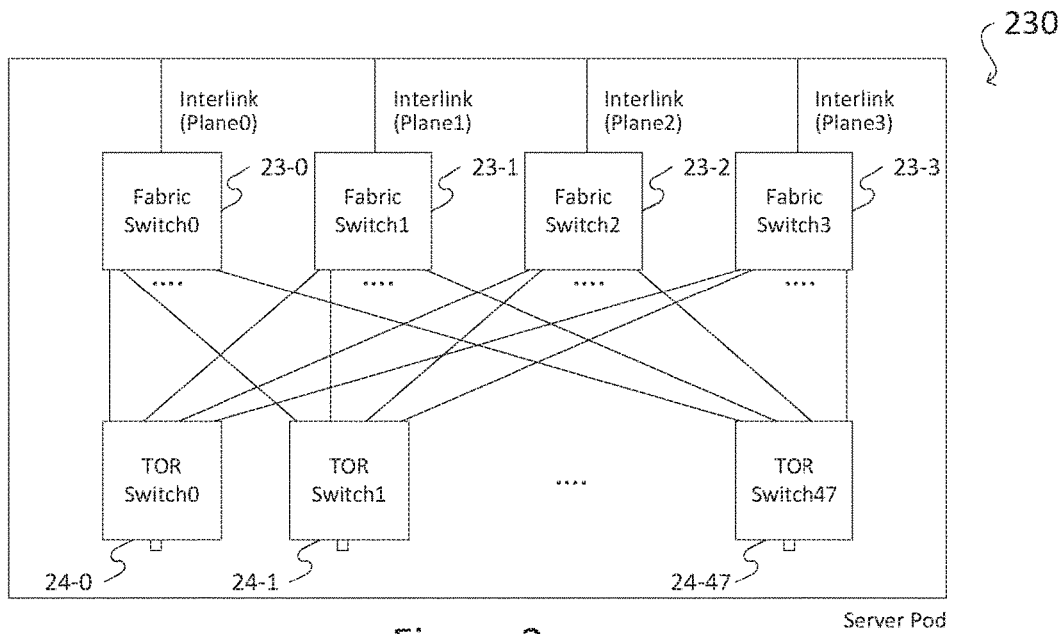
FIG. 2c shows in detail an implementation of a server pod of FIG. 2a using four fabric switches to distribute machine-to-machine traffic across 48 top-of-rack switches.
Figure 2D:
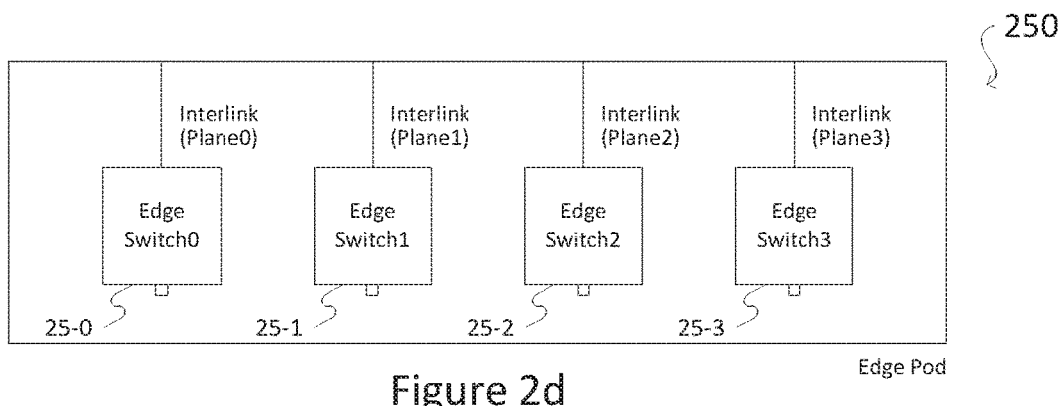
FIG. 2d shows in detail an implementation of an edge pod of FIG. 2a using four edge switches to provide uplink interfaces to connect to one or more external networks.
Figure 7A:
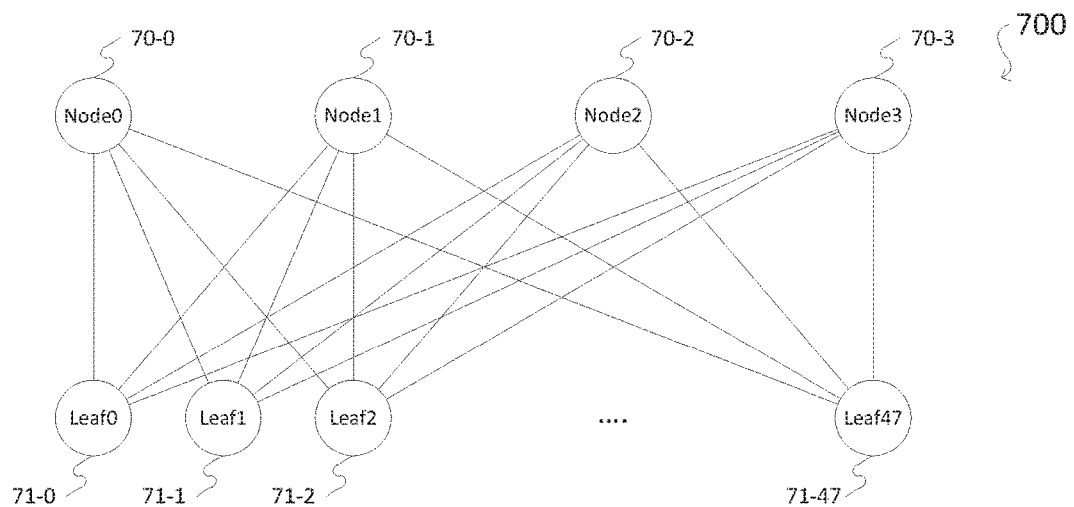
FIG. 7a shows that, in the architecture of the data center of FIG. 2a, the topology of a server pod may be reduced to a (4, 48) bipartite graph.

The inventor of the present invention investigated in detail the similarities and the differences between the full mesh topology of the present invention and other network topologies, such as the fat-tree topology in the data center network of FIG. 2a. The inventor first observes that, in the architecture of the data center network of FIG. 2a, the fat-tree network represented in a server pod (the "fabric/TOR topology") can be reduced to a (4, 48) bipartite graph, so long as the fabric switches merely perform an interconnect function for traffic originated among the TOR switches. This (4, 48) bipartite graph is shown in FIG. 7a. In FIG. 7a, the upper set of nodes, nodes 0-3 ("fabric nodes") 70-0 to 70-3, represent the four fabric switches in the server pod of FIG. 2*a* and the lower set of 48 nodes (i.e., leaf 0-47), labeled 71-0 to 71-47, represent the 48 TOR switches in a server pod of FIG. 2*a*.

Figure 7B:
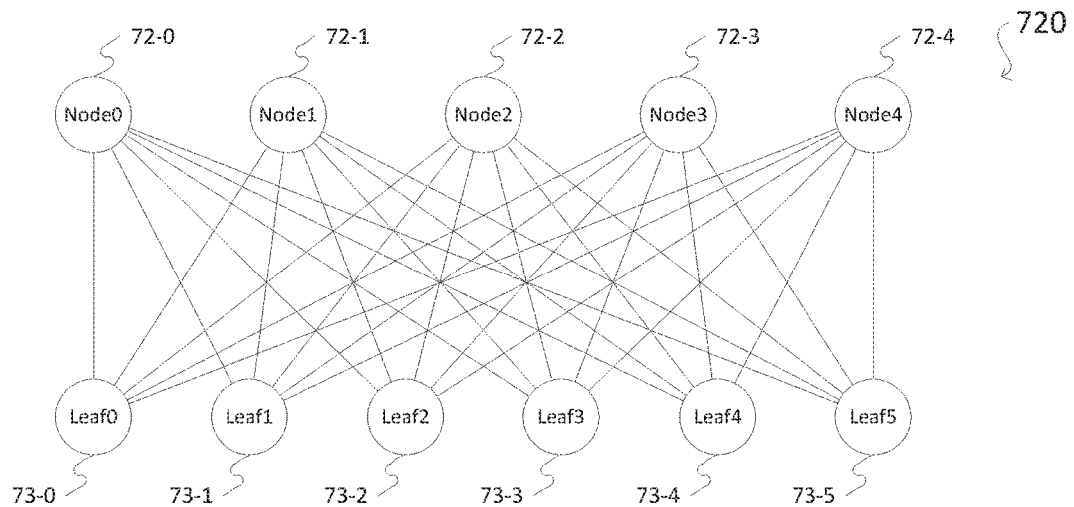
FIG. 7b shows, as an example, network 720 represented as a (5, 6) bipartite graph.
Figure 7C:
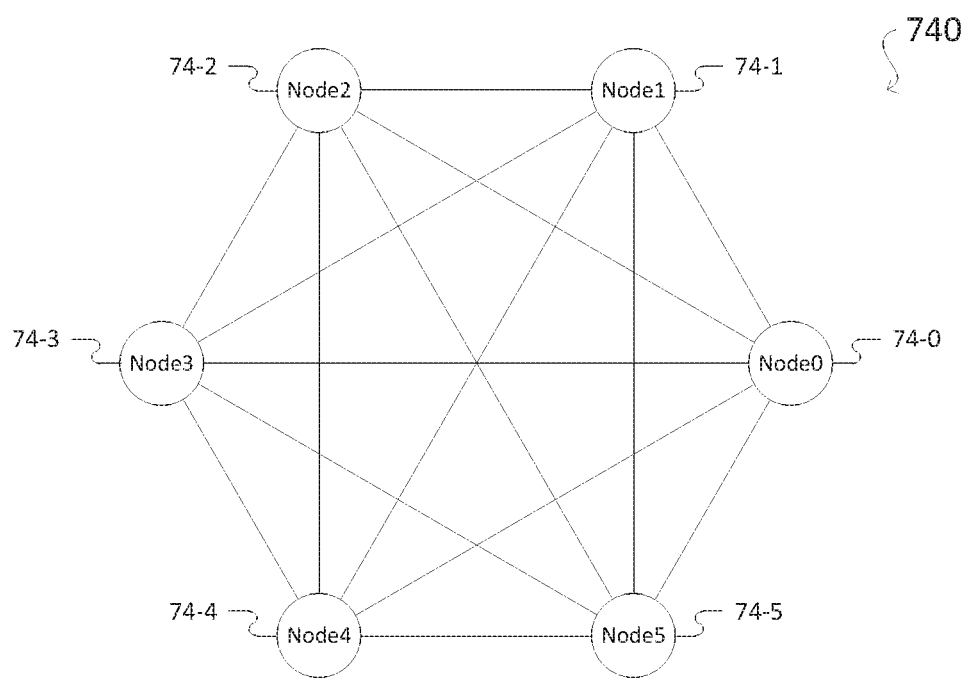
FIG. 7c shows the 6-node full mesh graph embedded in the (5, 6) bipartite graph of FIG. 7b.

The inventor discovered that an n-node full mesh graph is embedded in a fabric-leaf network represented by a bipartite graph with (n−1, n) nodes (i.e., a network with n−1 fabric nodes and n server leaves). FIG. 7*b* shows, as an example, a (5, 6) bipartite graph with 5 nodes 72-0 to 72-4 and 6 leaves 73-0 to 73-5. FIG. 7*c* shows the 6-node full mesh graph 740 with 6 nodes 74-0 to 74-5 embedded in the (5, 6) bipartite graph of FIG. 7*b*.

This discovery leads to the following rather profound results:
  (a) An n-node full mesh graph is embedded in an (n−1, n)-bipartite graph; and the (n−1, n) bipartite graph and the data center Fabric/TOR topology have similar connectivity characteristics;
  (b) A network in the (n−1, n) Fabric/TOR topology (i.e., with n−1 fabric switches and n TOR switches) can operate in same connectivity characteristics as a network with full mesh topology (e.g., network 500 of FIG. 5*a*);
  (c) Fabric switches are unnecessary in an (n−1, n) Fabric/TOR topology network, as the fabric switches merely performs an interconnecting function among the TOR switches (i.e., these fabric switches can be replaced by direct connections among TOR switches; and
  (d) A data center network based on a fat-tree topology (e.g., the Fabric/TOR topology) can be improved significantly using ICAS modules.

In the following, a data center network that incorporates ICAS modules in place of fabric switches may be referred to as an "ICAS-based" data center network. An ICAS-based data center network has the following advantages:
  (a) less costly, as fabric switches are not used;
  (b) lower power consumption, as ICAS modules are passive;
  (c) less congestion;
  (d) lower latency;
  (e) less network layers; and.
  (f) greater scalability as a data center network.

Figure 8A:
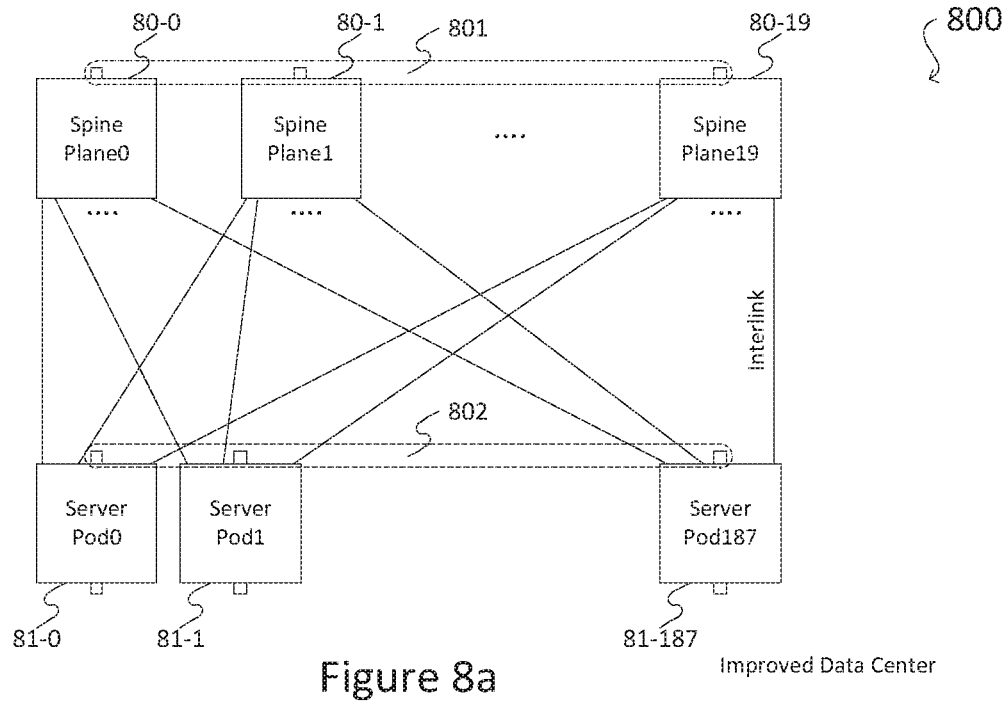
FIG. 8a shows an improved data center network 800, in accordance with one embodiment of the present invention; data center networks 800 includes 20 spine planes, providing optional uplinks 801, and 188 server pods, providing optional uplinks 802, uplinks 801 and 801 connecting to one or more external networks.

These results may be advantageously used to improve typical state-of-the-art data center networks. FIG. 8*a* shows an improved data center network 800, in accordance with one embodiment of the present invention. Data center network 800 uses the same types of components as the data center network of FIG. 2*a* (i.e., spine switches, fabric switches and TOR switches), except that the number of fabric switches are increased to one less than the number of TOR switches (FIG. 8*c* shows equal number of fabric switches and TOR switches because one of the TOR switch, the 21st TOR switch, is removed so that the connections are provided as an uplink interface to connect to one or more external networks, thus providing an uplink from each of the 20 fabric switches).

FIG. 8*a* shows the architecture of an improved data center network, organized by three layers of switching devices— i.e., "top-of-rack" (TOR) switches and fabric switches implemented in 188 server pods 81-0 to 81-187 and spine switches implemented in 20 spine planes 80-0 to 80-19— interconnected by interlinks in a fat-tree topology. An interlink refers to the network connections between a server pod and a spine plane. For example, interlink k of each of the 188 server pods is connected to spine plane k; interlink p of each of the 20 spine planes is connected to server pod p. The 20 spine planes each provide an optional uplink (e.g. uplink 801) and the 188 server pods each provide an optional uplink (e.g., uplink 802) for connection to one or more external networks. In this example, to allow comparison, the numbers of server pods and spine plane are chosen so that the improved data center network and the typical state-of-the-art data center network have identical network characteristics (2.2 Pbps total server-side bandwidth; 3:1 oversubscription ratio—server-side to network-side bandwidth ratio; Trident-II ASIC). Other configurations of the improved data center network are also possible, for instance, 32-TOR server pod or 48-TOR server pod but with higher radix switching silicon than the Trident-II ASIC.

Figure 8B:
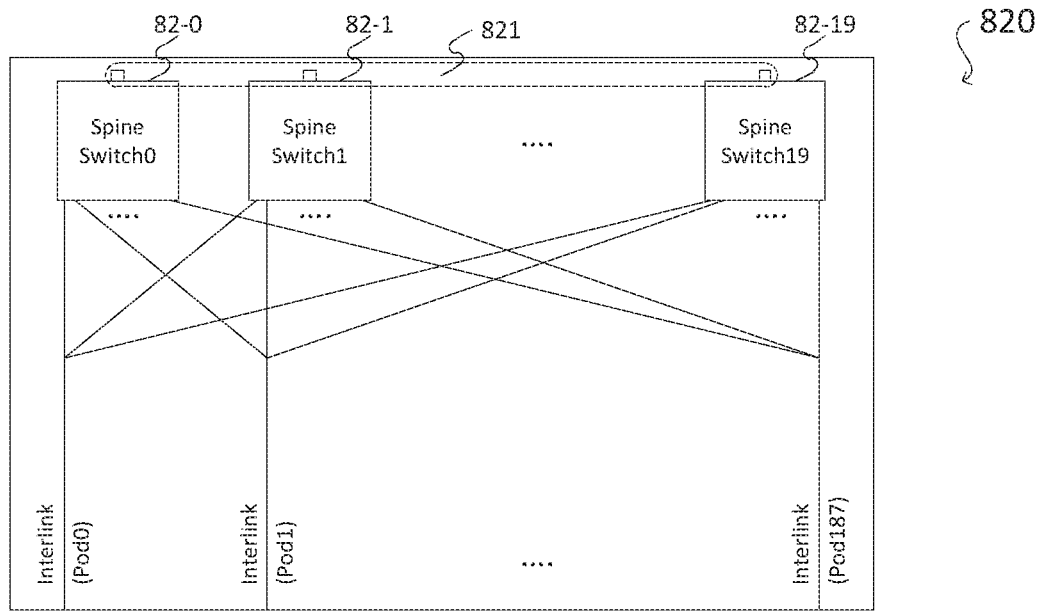
FIG. 8b shows in detail an implementation of modified spine plane 820, having 20 spine switches, providing optional uplink interface 821 for connecting to an external network.

Details of a spine plane of FIG. 8*a* are shown in FIG. 8*b*. In FIG. 8*b*, spine plane 820 consists of 20 spine switches 82-0 to 82-19 each connecting to 188 server pods. The connections from all 20 spine switches are grouped into 188 interlinks, with each interlink including a connection from each spine switch 82-0 to 82-19, for a total of 20 connections per interlink.

Figure 8C:
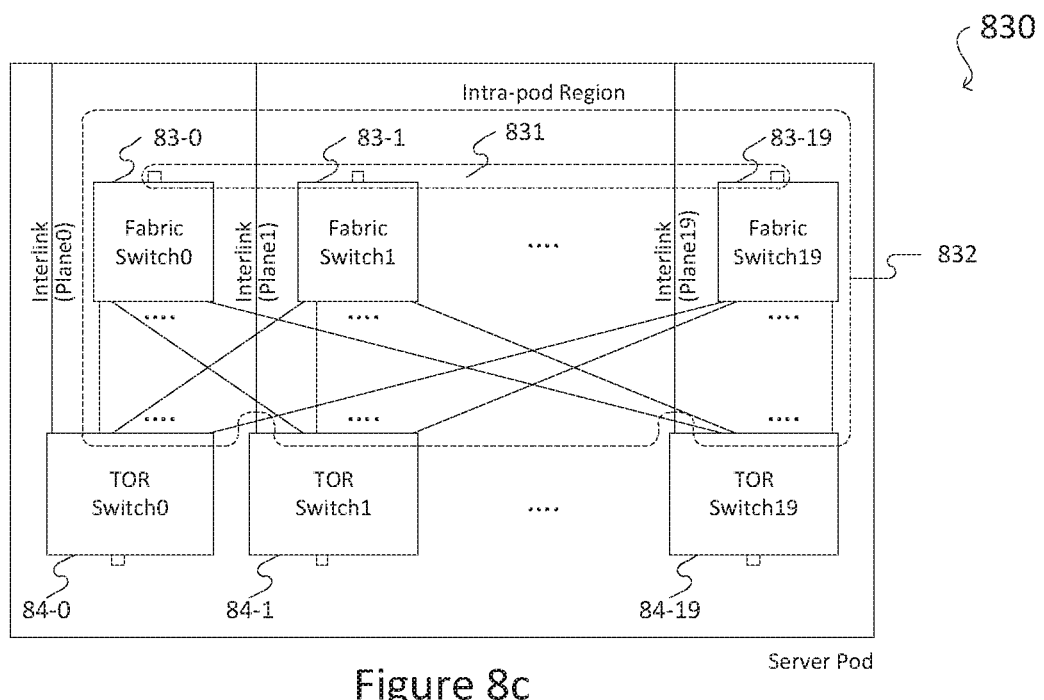
FIG. 8c shows in detail an implementation of modified server pod 830 in a (20, 21) fabric/TOR topology, having 20 fabric switches for distributing machine-to-machine traffic across 20 top-of-rack switches, in accordance with one embodiment of the present invention; the $21^{st}$ TOR switch is removed from the modified server pod 830 so that the connections are provided as optional uplink interfaces 831 for connecting the fabric switches to an external network.

Details of a server pod of FIG. 8*a* are shown in FIG. 8*c*. In FIG. 8*c*, the network-side interface (as opposed to the server-side interface) of the server pod is separated into intra-pod links and inter-pod links (i.e., the interlinks). The two link types are made independent from each other. The intra-pod region 832 consists of the intra-pod links, the intra-pod link side of the 20 TOR switches 84-0 to 84-19 and the 20 fabric switches 83-0 to 83-19 interconnected by 10G connections in a fat-tree topology. For example, connection kin each of the 20 TOR switches is connected to fabric switch k; connection p of each of the 20 fabric switches is connected to TOR switch p. 20 fabric switches each provide an optional uplink (e.g., uplink 831) to connect to an external network. The inter-pod region consists of the inter-pod links (i.e., the interlinks), the interlink side of the 20 TOR switches 84-0 to 84-19 each providing an interlink of 20 10-G connections to connect to all 20 spine switches on the same spine plane, for a total of 20 interlinks per server pod. For example, interlink k of each of the 188 TOR switches across the 188 server pods are connected to spine plane k; interlink p of each of the 20 spine planes are connected to server pod p. Each TOR switch provides 48×10G connections in 12×QSFP interfaces as downlink to connect to servers.

The data traffic through the fabric switches is primarily limited to intra-pod. The TOR switches now route both the intra-pod traffic as well as inter-pod traffic and are more complex. The independent link types achieve massive scalability in data center network implementations. (Additional independent links provided from higher radix switching ASIC may be created to achieve larger scale of connectivity objectives). Additionally, data center network 800 incorporates the full mesh topology concept (without physically incorporating an ICAS module) to remove redundant network devices and allow the use of innovative switching methods, in order to achieve a "lean and mean" data center fabric with improved data traffic characteristics.

As shown in FIG. 8*c*, FIG. 8*b* and FIG. 8*a*, data center network 800 includes 20×188 TOR switches and 20×188 fabric switches equally distributed over 188 server pods, and 20×20 spine switches equally distributed over 20 spine planes. In FIG. 8*a*, each TOR switch has 100 10G-connections (i.e., 25 QSFPs of bandwidth in 10G mode), of which 60 10G-connections are provided server-side and 40 10G-connections are provided network-side. (Among the network-side connections 20 10G-connections are used for intra-pod traffic and 20 10G-connections are used for inter-pod traffic). In each server pod, fabric switches 83-0 to 83-19 each include 21 10G-connections, of which 20 10G-connections are allocated to connect with a 10G-connection in each of TOR switches 84-0 to 84-19, and the rest being converted to provide as uplink interface to connect to external network. In this manner, fabric switches 83-0 to 83-19 support the intra-pod region data traffic and the uplinks in the server pod by a 21-node full mesh topology (with the uplinks of fabrics switches 0-19 collectively seen as one node). Using a suitable routing algorithm, such as any of those described above in conjunction with Single-Source-Multiple-Destination Traffic Aggregation and Port-to-Port Traffic Aggregation, network congestion can be eliminated from all fabric switches.

As the network in the intra-pod region of each server pod can operate in the same connectivity characteristics as a full mesh topology network, all the 20 fabric switches of the server pod may be replaced by an ICAS module. ICAS-based data center network 900, resulting from substituting fabric switches 83-0 to 83-19 of data center network 800, is shown in FIG. 9a. To distinguish from the server pod of data center network 800, a server pod with its fabric switches replaced by an ICAS module is referred to as an "ICAS pod."

FIG. 9a shows the architecture of an ICAS-based data center network, organized by two layers of switching devices—i.e., "top-of-rack" (TOR) switches, ICAS module implemented in 188 server pods 91-0 to 91-187 and spine switches implemented in 20 spine planes for 90-0 to 90-19—interconnected by interlinks in a fat-tree topology. Interlinks refer to network connections between ICAS pods and spine planes. For example, interlink k of each of the 188 ICAS pods is connected to spine plane k; interlink p of each of the 20 spine planes are connected to ICAS pod p. 20 spine planes provide optional uplinks 901 and 188 ICAS pods provide optional 20×10G uplinks 902 for connecting to an external network.

Details of a spine plane of FIG. 9a are shown in FIG. 9b. In FIG. 9b, spine plane 920 includes 20 spine switches 92-0 to 92-19 and fanout cable transpose rack 921. Through fanout cable transpose rack 921 connections from all 20 spine switches 92-0 to 92-19 are grouped into 188 interlinks, with each interlink including a connection from each spine switches 92-0 to 92-19, for a total of 20 connections per interlink. (Each interlink may include 5 QSFP straight cables.) On one side of fanout cable transpose rack 921 is 20 groups of 47 stackable MPO adapters per group, indicated by reference numeral 923, with each group of 47 adaptors providing 47 QSFP straight cables for connecting a spine switch. On another side of fanout cable transpose rack 921 is 188 groups of 5 stackable MPO adapters per group, labeled by reference numeral 924, with each group of 5 adaptors providing 5 QSFP straight cables to form an interlink for connecting to ICAS pod. The fiber connections from the spine switches and the fiber connections from interlinks are made at LC adapter-type mounting panel 922.

As pointed out earlier in this detailed description, the state-of-the-art data centers and switch silicon are designed with 4 interfaces (TX, RX) at 10 Gb/s or 25 Gb/s each per port in mind. Switching devices are interconnected at the connection level in ICAS-based data center. In such a configuration, a QSFP cable coming out from a QSFP transceiver is separated into 4 connections, and 4 connections from different QSFP transceivers are combined in a QSFP cable for connecting to another QSFP transceiver. Also, a spine plane may interconnect a large and varying number of ICAS pods (e.g., in the hundreds) because of the scalability of an ICAS-based data center network. Such a cabling scheme is more suitable to be organized in a fanout cable transpose rack (e.g., fanout cable transpose rack 921), which may be one or multiple racks and be integrated into the spine planes. Specifically, the spine switches and the TOR switches may each connect to the fanout cable transpose rack with QSFP straight cables. Such an arrangement simplifies the cabling in a data center. FIG. 9b illustrates such an arrangement for data center network 900 of FIG. 9a.

Figure 9C:
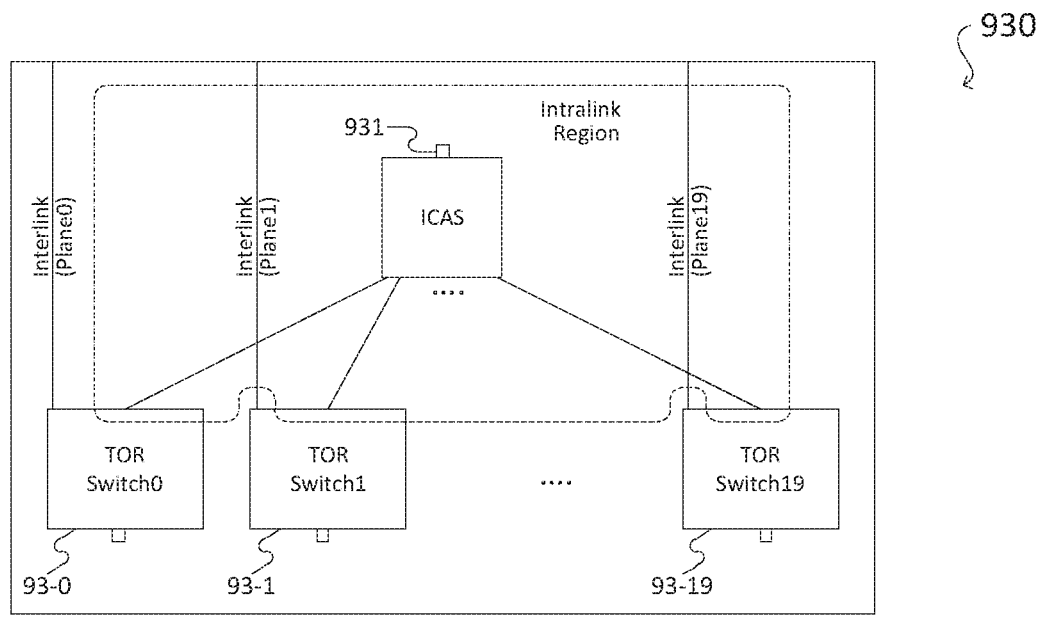
FIG. 9c shows in detail an implementation of ICAS pod 930, which is achieved by replacing fabric switches 83-0 to 83-19 in server pod 830 of FIG. 8c, according to one embodiment of the present invention; each ICAS pod provides 20×10G uplinks 931 for connecting to an external network.

Details of an ICAS pod of FIG. 9a are shown in FIG. 9c. In FIG. 9c, the network-side interface (as opposed to the server-side interface) of an ICAS pod is divided into intra-pod links and inter-pod links (i.e., interlinks) and the two links types are made independent from each other. The intra-pod region consists of intra-pod links between the 20 TOR switches 93-0 to 93-19 and ICAS module 931, interconnected by 10G connections in a full mesh topology. ICAS module 931 provides optional 20×10G uplinks to connect to one or more external network. The inter-pod region consists of inter-pod links (i.e., the interlinks) each provided between one of 20 TOR switches 93-0 to 93-19 and a corresponding one of 20 spine planes. Each interlink includes 20 10-G connections for connecting to all 20 spine switches on the corresponding spine plane. For example, interlink k of each of 188 TOR switches across the 188 ICAS pods is connected to spine plane k; interlink p of each of the 20 spine planes is connected to server pod p. Each TOR switch provides 60×10G connections in 15×QSFP interfaces as downlink for connecting to servers.

The data traffic through the ICAS module is primarily limited to intra-pod. The TOR switches now perform routing for the intra-pod traffic as well as inter-pod traffic and are more complex. The independent link types achieve massive scalability in data center network implementations. (Additional independent links provided from higher radix switching ASIC may be created to achieve a larger scale of connectivity objectives).

As shown in FIG. 9c, FIG. 9b and FIG. 9a, each TOR switch allocates 20×10G-connections (5×QSFPs in 10G mode) to connect to its associated ICAS module (e.g., ICAS module 931) to support intra-pod traffic, and 5 QSFPs in 10G mode (20 10G-connections) to connect to the fiber transpose rack to support inter-pod traffic. As shown in FIG. 9c, each ICAS pod includes 20×5 QSFP transceivers for intra-pod traffic, connected by 100 QSFP straight cables, and 20×15 QSFP (10G mode) transceivers for server traffic, for a total 500 QSFP transceivers. The 20 TOR switches in an ICAS pod may be implemented by 20 Trident II ASICs. Although 20 TOR switches are shown in each WAS pod in FIG. 9c, the ICAS module is scalable to connect up to 48 TOR switches in a ICAS pod (based on 32×QSFP Trident-II+ switch ASIC). Also, each ICAS pod operates as a layer-3 cluster running BGP and ECMP.

Together, the ICAS pods and the spine planes form a modular network topology capable of accommodating hundreds of thousands of 10G-connected servers, scaling to multi-petabit bisection bandwidth, and covering a data center with congestion improved and non-oversubscribed rack-to-rack performance.

Figure 9D:
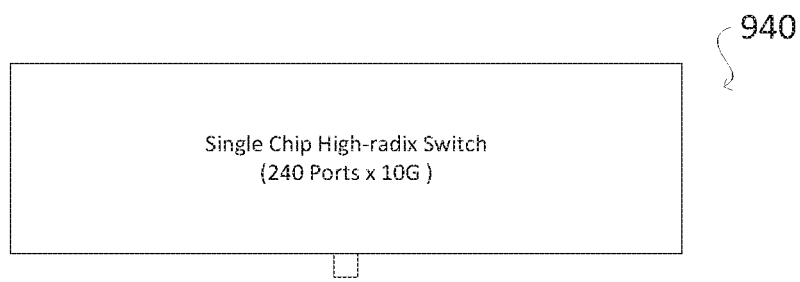
FIG. 9d illustrates a spine switch implemented with a single chip high-radix (i.e., a high port count) switching integrated circuit; such a spine switch makes use of the highest port count switching integrated circuit available at present time.

According to one embodiment of the present invention, a spine switch can be implemented using a high-radix (e.g., 240×10G) single chip switching device, as shown in FIG. 9d. Single-chip implementation saves the cost of extra transceivers, cables, rack space, latency and power consumption than multi-unit (rack unit) chassis-based switching device and stackable switching device implementations. The disadvantage of the single-chip spine switch approach is its network scalability, which limits the system to 240 ICAS pods at this time. As mentioned above, the semiconductor implementation limits the scale of a high-radix switching integrated circuit.

Figure 9E:
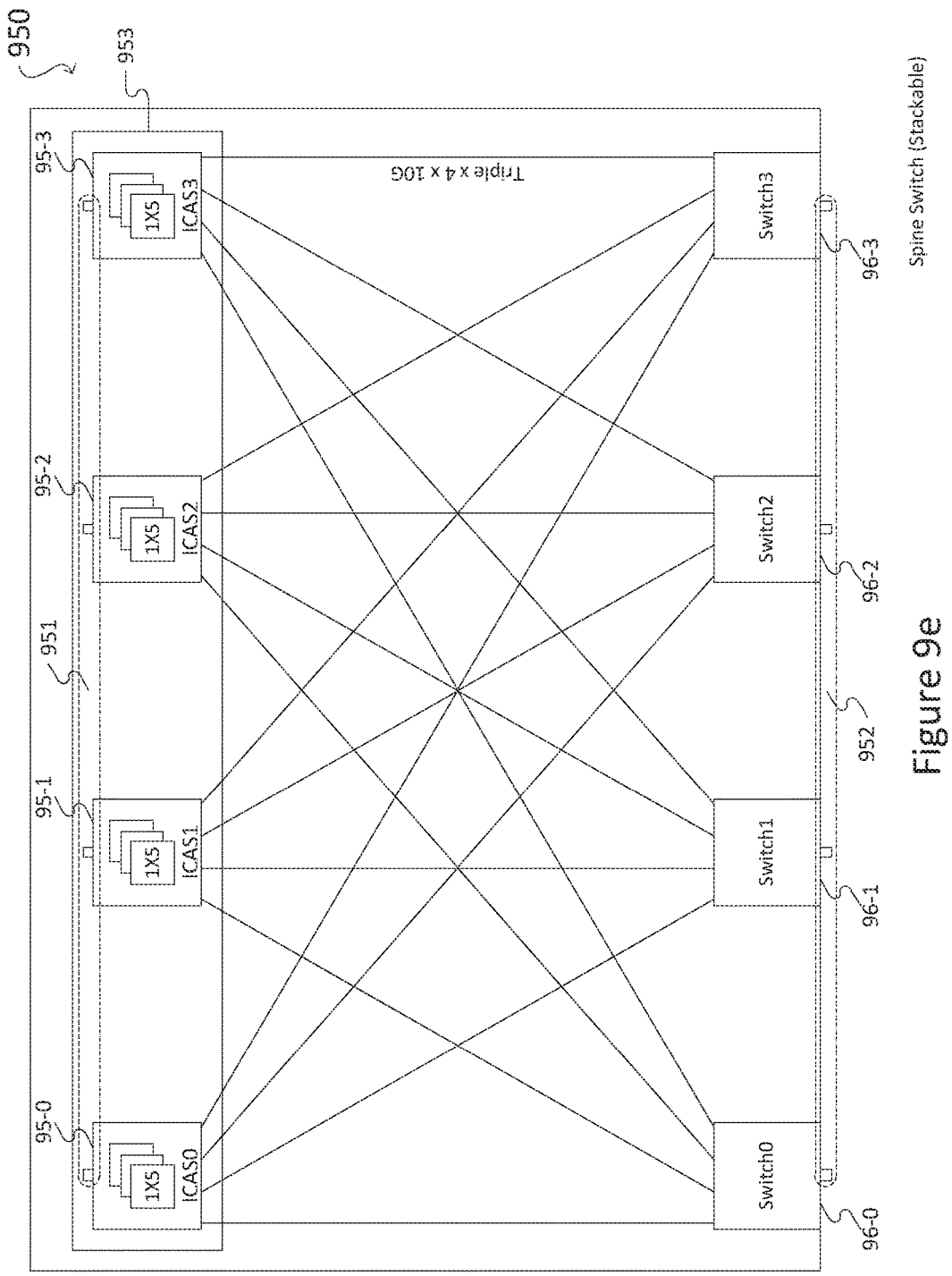
FIG. 9e shows a spine switch formed by stacking four switch boxes each implemented by a Trident-II ASICs (96×10G configuration each) and 1 ICAS box 953; ICAS box 953 includes four ICAS modules 95-0 to 95-3 in one IU chassis, with each ICAS module having three copies of ICAS1X5 configuration, such that ICAS box 953 provides a non-blocking 1:1 subscription ratio to each of four switch boxes 96-0 to 96-3.

To work-around the CMOS semiconductor limitation, one may create a stackable switching device, in which multiple ICAS modules and switching devices are put in a rack or in multiple racks to form a larger high-radix (i.e., high port-count) spine switch, such as shown in FIG. 9e.

Details of an ICAS-based stackable switching device 950 are shown in FIG. 9e. FIG. 9e shows ICAS modules 95-0 to 95-3 each connect in a full mesh topology to four Trident-II ASIC-based switches 96-0 to 96-3, illustrating how such switches may be used to builds a stackable spine switch. FIG. 9e shows each of switches 96-0 to 96-3 having a switching bandwidth of 24 QSFPs in 10G mode provided in 1:1 subscription ratio and an ICAS box 953 integrating four ICAS modules 95-0 to 95-3 in one 1U chassis, with each ICAS module containing three duplicate copies of ICAS1X5 sub-modules and each sub-module providing 4×10G uplink 951. The four switches 96-0 to 96-3 provide data links 952 of 1.92 Tbps bandwidth to connect to servers. ICAS-based stackable switching device 950 provides total uplink bandwidth of 480 Gbps (4×3×40 Gbps) to connect to one or more external networks, facilitates a non-blocking 1:1 subscription ratio and provides a full-mesh non-blocking interconnect, with a total of 1.92 Tbps of switching bandwidth.

ICAS-based stackable switching device has the benefits of improved network congestion, saving the costs, power consumption and space savings than the switching devices implemented in the state of the art data center. As shown in the "ICAS+Stackable Chassis" column of Table 4, data center with ICAS and ICAS-based stackable switching device performs remarkably with total switching ASIC saving by 53.5%, total power consumption saving by 26.0%, total space saving by 25.6% and much improved network congestion performance. However total QSFP transceiver usage is increased by 2.3%.

The above stackable switching device is for illustrative purpose only. A person of ordinary skill in the art may expand the scalability of the stackable switching device. The present invention is not limited by the illustration.

One embodiment of the present invention also provides a multi-unit (rack unit) chassis-based switching device. The multi-unit chassis switching device groups many switching integrated circuits across multiple line cards. The multi-unit chassis-based switching device interconnects line cards, control cards, CPU cards through PCB-based fabric cards or backplane and saves the proportion cost of transceivers, cables and rack space required to interconnect them. It is instructive to learn that a "rack unit" ("RU" or simply "U") is a measure of chassis height in data center and equals to 1.75 inches tall. A full rack is a 48U (48 rack unit) tall rack.

Figure 9F:
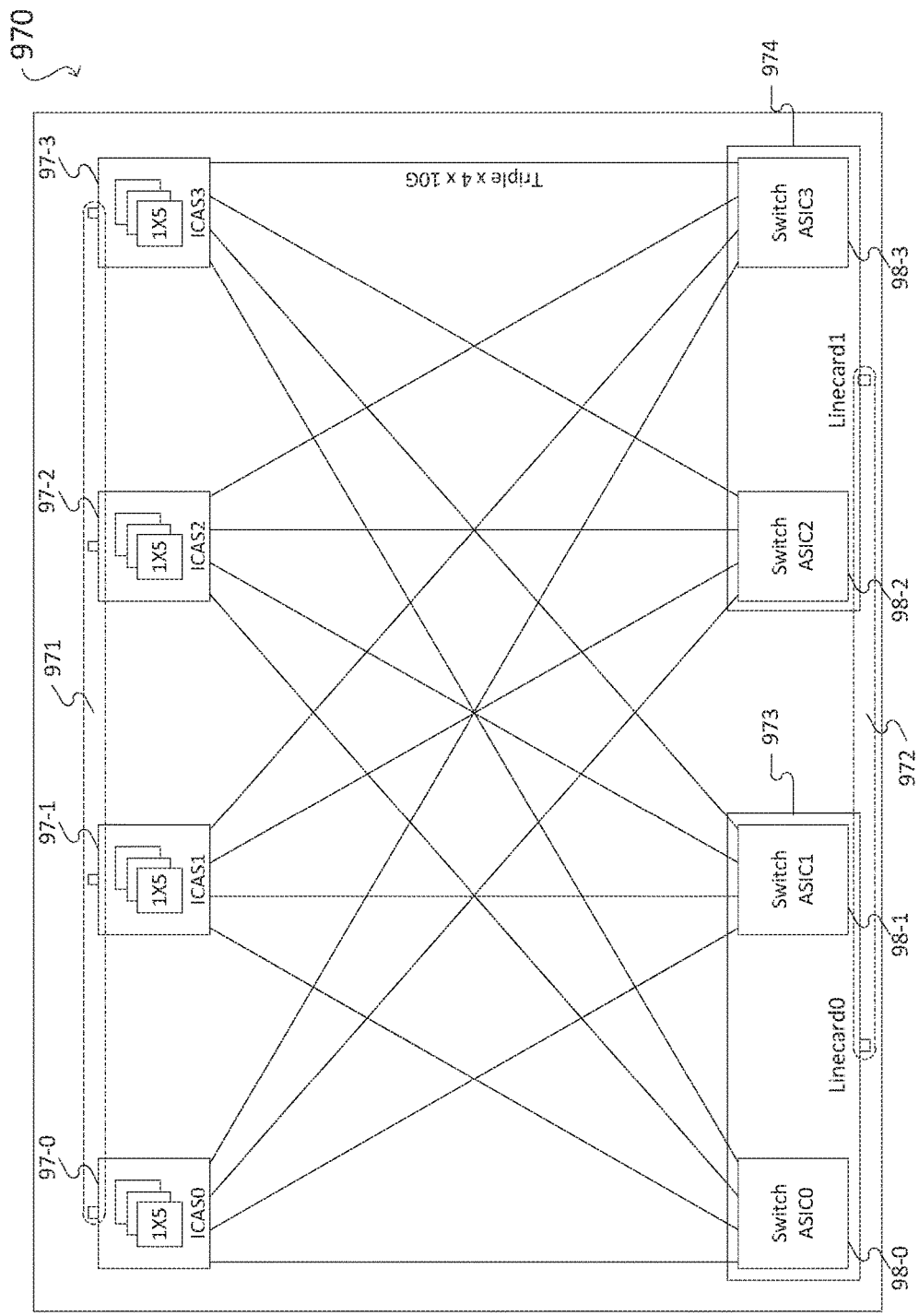
FIG. 9f shows a spine switch of an ICAS-based multi-unit switching device in which four ICAS-based fabric cards 97-0 to 97-3 connect in a full mesh topology to switching ASIC's 98-0 to 98-3, with switching ASIC 98-0 and 98-1 being housed in line card 973 and switching ASIC's 98-2 and 98-3 being housed in line card 974.

Details of an ICAS-based multi-unit chassis switching device 970 are shown in FIG. 9f. FIG. 9f shows four ICAS-based fabric cards 97-0 to 97-3 each being connected in a full mesh topology to switching ASIC's 98-0 to 98-3. In FIG. 9f, switching ASIC 98-0 and 98-1 are housed in line card 973 and switching ASIC's 98-2 and 98-3 are housed in line card 974. Line cards 973 and 974 are connected through high speed printed circuit board (PCB) connectors to fabric cards 97-0 to 97-3. As shown in FIG. 9f, four Trident-II ASIC-based switches 98-0 to 98-3 may be used to builds a multi-unit chassis switch, each having a switching bandwidth of 24 QSFPs in 10G mode provided in 1:1 subscription ratio, and four ICAS-based fabric cards 97-0 to 97-3 containing three duplicate copies of ICAS1X5 sub-modules, with each sub-module providing 4×10G uplink 971. Two line cards provide data links 972 of 1.92 Tbps of bandwidth to connect to servers. ICAS-based multi-unit chassis switching device 970 provides a total uplink bandwidth of 480 Gbps (4×3×40 Gbps) to connect to one or more external networks and facilitates a full-mesh non-blocking 1:1 subscription ratio interconnect, with a total of 1.92 Tbps of switching bandwidth.

Multi-unit chassis-based switching device with fabric cards that are ICAS-based full-mesh topology has the benefits of improved network congestion, saving the costs and power consumption than that of ASIC-based fabric cards implementation with fat-tree topology. As shown in the "ICAS+Multi-unit Chassis" column of Table 4, a data center with ICAS and ICAS-based multi-unit chassis-based switching device performs remarkably with a total QSFP transceiver saving by 12.6%, total switching ASIC saving by 53.5%, total power consumption saving by 32.7%, total space saving by 29.95% and much improved network congestion performance.

The above multi-unit chassis switching device is for illustrative purpose only. A person of ordinary skill in the art may expand the scalability of the multi-unit chassis switching device. The present invention is not limited by the illustration.

The multi-unit chassis-based switching device has the disadvantage of a much longer development time and a higher cost to manufacture due to its system complexity and is also limited overall by the form factor of the multi-unit chassis. The multi-unit chassis-based switching device, though provides a much larger port count than the single-chip switching device. Although the stackable switching device requires additional transceivers and cables than that of the multi-unit chassis-based approach, the stackable switching device approach has the advantage of greater manageability in the internal network interconnection, virtually unlimited scalability, and requires significantly less time for assembling a much larger switching device.

The material required for (i) the data center networks of FIG. 2a, using state of the art multi-unit switching device ("Fat-tree+Multi-unit Chassis"), (ii) an implementation of data center network 900 of FIG. 9a, using ICAS-based multi-unit switching device "ICAS+Multi-unit Chassis", and (iii) an implementation of data center network 900 of FIG. 9a, using ICAS-based stackable switching device "ICAS+Stackable Chassis" are summarized and compared in Table 4,

TABLE 4

|  | Fat-tree + Multi-unit Chassis | ICAS + Multi-unit Chassis | ICAS + Stackable Chassis |
| --- | --- | --- | --- |
| Intralink (within Pod) | N/A | 5 | 5 |
| Interlink (Across Pod) | 4 | 5 | 5 |
| Downlink (to Server) | 12 | 15 | 15 |
| Total | 16 | 25 | 25 |
| D:U ratio | 3 | 3 | 3 |
| D:I ratio | N/A | 3 | 3 |
| Number of 10G Interface (for comparison) | 96 | 184.3 | 184.3 |
| QSFP XCVR Module (Watt) | 4 | 4 | 4 |
| TOR Switch (Watt) | 150 | 200 | 200 |
| Multi-unit Chassis (Watt) | 1660 | 0 | 0 |
| Spine-side Interlink QSFP XCVR | 18432 | 18800 | 38000 |
| TOR-side Interlink QSFP XCVR | 18432 | 18800 | 18800 |
| Fabric/TOR-side Intralink QSFP XCVR | 36864 | 18800 | 18800 |
| Server-side QSFP XCVR | 55296 | 56400 | 56400 |

TABLE 4-continued

| | Fat-tree + Multi-unit Chassis | ICAS + Multi-unit Chassis | ICAS + Stackable Chassis |
|---|---|---|---|
| Total QSFP XCVR | 129024 | 112800 (12.6%) | 132000 (−2.3%) |
| ASIC in Spine Switch | 2304 | 1600 | 1600 |
| ASIC in Fabric Switch | 4608 | 0 | 0 |
| ASIC on Tor Switvh | 4608 | 3760 | 3760 |
| Total Switching ASIC | 11520 | 5360 (53.5%) | 5360 (53.5%) |
| Spine Switch (KW) | 392.448 | 327.2 | 472.0 |
| Fabric Switch (KW) | 784.896 | 0 | 0 |
| TOR Switch (KW) | 986.112 | 1128.0 | 1128.0 |
| Total Power Consumption (KW) | 2163.456 | 1455.2 (32.7%) | 1600 (26.0%) |
| 96 x QSFP Spine Switch (8U) | 1536 | 0 | 0 |
| 96 x QSFP Fabric Switch (8U) | 3072 | 0 | 0 |
| 48 x QSFP Spine Switch (4U) | 0 | 1600 | 1600 |
| TOR Switvh (1U) | 4608 | 3760 | 3760 |
| ICAS1X5TRIPLE (1U) | 0 | 0 | 400 |
| ICAS5X21 (2U) | 0 | 376 | 376 |
| Transpose Rack (36U) | 0 | 720 | 720 |
| ICAS2X9 (1U) | 0 | 0 | 0 |
| ICAS8X33 (4U) | 0 | 0 | 0 |
| ICAS10C41 (6U) | 0 | 0 | 0 |
| ICAS16X65 (16U) | 0 | 0 | 0 |
| Total Rack Unit (U) | 9216 | 6456 (29.95%) | 6856 (25.6%) |
| Pod Interlink Bandwidth (Tbps) | 7.7 | 4.0 | 4.0 |
| Pod Intralink Bandwidth (Tbps) | 7.7 | 4.0 | 4.0 |
| Total Data Link Bandwidth (Pbps) | 2.2 | 2.2 | 2.2 |
| Per Plane Uplink Bandwidth (Tbps) | 7.7/plane | 0 | 0 |
| Total Spine Uplink Bandwidth (Tbps) | 0 | 150.4 | 601.6 |
| Total ICAS Uplink Bandwidth (Tbps) | 0 | 37.6 | 37.6 |
| Spine-side Interlink QSFP Cable | 18432 | 18800 | 18800 |
| QSFP Fanout Cable (Transpose Rack) | 0 | 37600 | 37600 |
| QSFP Fanout Cable (ICAS5X21) | 0 | 19740 | 19740 |
| TOR-side Interlink QSFP Cable | 0 | 18800 | 18800 |
| TOR-side Intralink QSFP Cable | 18432 | 18800 | 18800 |
| Spine Switch QSFP Cable | 0 | 0 | 19200 |
| QSFP Fanout Cable (ICAS1X5TRIPLE) | 0 | 0 | 19200 |
| Total QSFP Cable | 36864 | 56400 | 75600 |
| Total QSFP Fanout Cable | 0 | 57340 | 76540 |

As shown in Table 4, the ICAS-based systems require significantly less power dissipation, ASICs and space, resulting in reduced material costs and energy.

The above detailed description is provided to illustrate specific embodiments of the present invention and is not intended to be limiting. Numerous modifications and variations within the scope of the present invention are possible. The present invention is set forth in the accompanying claims.

I claim:

1. A data center network having a plurality of data interfaces for receiving and transmitting data signals from and to a plurality of servers, comprising:
a first plurality of data switching units, wherein each of the first plurality of data switching units comprises (a) a plurality of first level interconnecting devices providing a subset of the data interfaces; and (b) one or more second level interconnecting devices routing data signals of the subset of data signals among the subset of data interfaces of the first level interconnecting device and a data interface with an external network, wherein the first and second interconnecting devices are interconnected to implement a full mesh network of a predetermined number of nodes; and
a second plurality of data switching units, wherein each of the second plurality of the data switching units comprises a plurality of third level interconnecting devices, wherein each third level interconnecting device routes data signals received from, or to be transmitted to, a corresponding one of the first level interconnecting devices in each of the first plurality of data switching units.

2. The data center network of claim 1, wherein the data signals of each data interface are received from or to be transmitted to optical transceiver.

3. The data center network of claim 1, wherein the first level interconnecting devices comprise "top-of-rack" (TOR) switches.

4. The data center network of claim 1, wherein the second level interconnecting devices comprise fabric switches, wherein the full network comprises the predetermined number of first level interconnecting devices and the predetermined number less one fabric switches.

5. The data center network of claim 1, wherein the second level interconnecting devices of each of the first plurality of data switching units comprise an interconnect module, which comprise:
n optical data ports each comprising n−1 optical interfaces, wherein each optical interface receives and transmits data signals over a communication medium; and
an interconnecting network implementing a full mesh topology for interconnecting the optical interfaces of each port each to a respective one of the optical interfaces of each of the other ports.

6. The data center network of claim 5, wherein one of the optical data ports is provided as an uplink interface for connecting to an external network.

7. The data center network of claim 5, wherein the interconnecting network comprises optical fibers.

8. The data center network of claim 5, wherein the optical interfaces each receive and transmit optical signals to and from optical transceiver.

9. The data center network of claim 5, wherein the second level connecting devices provide communication links for traffic among the first level interconnecting devices.

10. The data center network of claim 1, wherein the third level interconnecting devices each comprise a spine switch.

11. The data center network of claim 10, wherein each first level interconnecting device is connected by communication links to each of the spine switches in each of the second plurality of data switching units.

12. The data center network of claim 11, wherein the communication links in each of the second plurality of data switching units are implemented at least in part by a fanout cable transpose rack.

13. The data center network of claim 12, wherein each first level interconnecting device is connected by a fanout cable transpose rack to each of the spine switches in each of the second plurality of data switching units.

14. The data center network of claim 13, wherein the fanout cable transpose rack comprises a fraction of a full-rack, a standalone full rack, or multiple, full racks.

15. The data center network of claim 10, wherein the spine switch comprises one or more switching elements connected to one or more interconnect modules, each interconnect modules comprising:
n optical data ports each comprising n-1 optical interfaces, wherein each optical interface receives and transmits data signals over a communication medium; and
an interconnecting network implementing a full mesh topology for interconnecting the optical interfaces of each port each to a respective one of the optical interfaces of each of the other ports.

16. The data center network of claim 15, wherein one of the optical data ports is provided as an uplink interface for connecting to an external network.

17. The data center network of claim 15, wherein the interconnecting network comprises optical fibers.

18. The data center network of claim 15, wherein the optical interfaces each receive and transmit optical signals to and from optical transceiver.

19. The data center network of claim 15, wherein the switching elements and the interconnection modules are each packaged in a stackable, rack-mount chassis.

20. The data center network of claim 19, wherein the stackable switching device comprises multiple network devices, each being 1U high.

21. The data center network of claim 15, wherein the switching elements and the interconnection modules are packaged in a printed circuit board-based multi-unit rack mount chassis.

22. The data center network of claim 21, wherein the multi-unit switching device is multiple rack units high.

* * * * *